(12) United States Patent
Sato et al.

(10) Patent No.: US 9,670,320 B2
(45) Date of Patent: Jun. 6, 2017

(54) METHOD FOR PRODUCING POLYIMIDE RESIN POWDER, AND THERMOPLASTIC POLYIMIDE RESIN POWDER

(71) Applicant: MITSUBISHI GAS CHEMICAL COMPANY, INC., Chiyoda-ku (JP)

(72) Inventors: Yuuki Sato, Kanagawa (JP); Jun Mitadera, Kanagawa (JP)

(73) Assignee: MITSUBISHI GAS CHEMICAL COMPANY, INC., Chiyoda-ku (JP)

(*) Notice: Subject to any disclaimer, the term of this patent is extended or adjusted under 35 U.S.C. 154(b) by 0 days.

(21) Appl. No.: 14/905,637

(22) PCT Filed: Aug. 4, 2014

(86) PCT No.: PCT/JP2014/070532
§ 371 (c)(1),
(2) Date: Jan. 15, 2016

(87) PCT Pub. No.: WO2015/020019
PCT Pub. Date: Feb. 12, 2015

(65) Prior Publication Data
US 2016/0159984 A1  Jun. 9, 2016

(30) Foreign Application Priority Data

Aug. 6, 2013 (JP) ................ 2013-163303
Aug. 6, 2013 (JP) ................ 2013-163304
Aug. 6, 2013 (JP) ................ 2013-163308

(51) Int. Cl.
*C08G 75/00* (2006.01)
*C08G 73/10* (2006.01)
*C09J 179/08* (2006.01)
*C08G 63/00* (2006.01)

(52) U.S. Cl.
CPC ....... *C08G 73/1032* (2013.01); *C08G 73/105* (2013.01); *C08G 73/1028* (2013.01); *C08G 73/1042* (2013.01); *C08G 73/1082* (2013.01); *C09J 179/08* (2013.01)

(58) Field of Classification Search
CPC ................................ C08G 73/1032
USPC ............. 524/127; 264/331.19; 528/176, 179
See application file for complete search history.

(56) References Cited

U.S. PATENT DOCUMENTS 4,600,770 A    7/1986  Gagliani et al.
2011/0318588 A1  12/2011  Fukukawa et al.

FOREIGN PATENT DOCUMENTS

| JP | 57-200453 A | 12/1982 |
| JP | 61-168669 A | 7/1986 |
| JP | 7-300524 A | 11/1995 |
| JP | 7-324134 A | 12/1995 |
| JP | 2000-204172 A | 7/2000 |
| JP | 2004-83885 A | 3/2004 |
| JP | 2005-28524 A | 2/2005 |
| JP | 2007-217486 A | 8/2007 |
| JP | 2009-241157 A | 10/2009 |
| JP | 2013-144751 A | 7/2013 |
| JP | 2013144751 | * 7/2013 |
| WO | WO 2013/041530 A1 | 3/2013 |
| WO | WO 2014/061781 A1 | 4/2014 |

OTHER PUBLICATIONS

International Search Report issued Oct. 21, 2014, in PCT/JP2014/070532 filed Aug. 4, 2014.

* cited by examiner

*Primary Examiner* — Terressa Boykin
(74) *Attorney, Agent, or Firm* — Oblon, McClelland, Maier & Neustadt, L.L.P.

(57) ABSTRACT

The present invention provides a method for producing a polyimide resin powder, including the step of reacting (A) a tetracarboxylic acid component containing a tetracarboxylic dianhydride with (B) a diamine component containing an aliphatic diamine in the presence of (C) a solvent containing an alkylene glycol-based solvent represented by the formula (1):

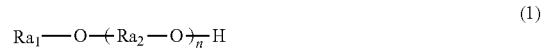

wherein $Ra_1$ represents a hydrogen atom or an alkyl group having from 1 to 4 carbon atoms, $Ra_2$ represents a linear alkylene group having from 2 to 6 carbon atoms, and n represents an integer of 1-3.

22 Claims, 6 Drawing Sheets

METHOD FOR PRODUCING POLYIMIDE RESIN POWDER, AND THERMOPLASTIC POLYIMIDE RESIN POWDER

TECHNICAL FIELD

The present invention relates to a method for producing a polyimide resin powder, and a thermoplastic polyimide resin powder.

BACKGROUND ART

Aromatic polyimide resins are useful engineered plastics having the rigidity and resonance stabilization of their molecular chains as well as high thermal stability, high strength, and high solvent resistance because of their strong chemical bonds. The aromatic polyimide resins, however, are generally difficult to mold by heat fusion due to their high thermal stability. Also, their molded products are generally difficult to obtain via a polyimide solution due to their high solvent resistance. Thus, methods adopted for producing the molded products of the aromatic polyimide resins involve reacting a tetracarboxylic acid component with a diamine component to prepare a polyamic acid, and molding the polyamic acid at this stage, followed by the imidization of the polyamic acid by various methods. One of the most known methods is a method which involves reacting an aromatic tetracarboxylic acid component with a diamine containing an aromatic ring in a high-boiling point solvent such as N-methylpyrrolidone or dimethylacetamide to prepare a polyamic acid, molding the polyamic acid into a film form on a support, and then thermally imidizing this polyamic acid under high temperature conditions to obtain a polyimide film (see PTL1).

This method, however, requires a plurality of labors, i.e., requires (1) uniform volatilization of the solvent for molding the polyamic acid into a film form, and (2) a high temperature exceeding 300° C. in the subsequent imidization.

However, some aromatic polyimide resins can be molded by recovery in a powder state and subsequent exposure to high temperature and high pressure for a long time (see PTL2).

On the other hand, among semi-aromatic polyimide resins or fully aliphatic polyimide resins, some polyimide resins have been reported to have solvent solubility or thermoplasticity. The solvent-soluble polyimide resins can be molded into films from polyimide varnish, and the thermoplastic polyimide resins can be molded into various forms by heat fusion. These polyimide resins having molding processability can be molded even if the resins are obtained in forms that are not final product forms, i.e., in a powder or clump form. Thus, such semi-aromatic polyimide resins or fully aliphatic polyimide resins are superior to the aromatic polyimide resins from the viewpoint of molding processability.

Since there exist a large number of molding process techniques for polyimide resin powders, the polyimide resin powders are highly versatile. Particularly, if polyimide resins can be recovered as homogeneous powders, these powders are highly useful because uneven processing is less likely to occur during the molding process. The polyimide resins in a powder form also have advantages such as high storage stability and easy delivery.

PTL3 has reported a method for synthesizing a polyimide resin at normal pressure and recovering the polyimide resin as a powder. PTL3 has reported that an aromatic tetracarboxylic acid and a linear aliphatic diamine are heated at a temperature on the order of 160° C. in N-methyl-2-pyrrolidone and toluene to form a polyimide resin in a powder form. This reaction is also called imidization under heating to reflux, which is also characterized in that a polyimide resin is deposited as a powder.

The synthesis method by the imidization under heating to reflux, however, can be used actually only in rare cases as a method for synthesizing a polyimide resin using an aliphatic diamine. In general, N-methyl-2-pyrrolidone, dimethylacetamide, or the like is used as a polymerization solvent for polyimide resins. The synthesis of semi-aromatic polyimide resins in these solvents presents many problems, for example: (1) a strong salt of the tetracarboxylic acid and the aliphatic diamine and/or a strong salt of the polyamic acid and the aliphatic diamine is formed so that a large amount of deposits are generated at the initial stage of the reaction, thereby causing poor stirring or inhomogeneous reaction; (2) although the polyimide resin is recovered as a deposited solid, this solid forms large clumps due to unstable particle sizes or has poor filterability due to its too small particles; and (3) since the reaction time is several hours or longer, productivity cannot be secured. Hence, it must be said that this synthesis approach is poorly practical. In fact, the polyimide resin prepared using an aliphatic diamine is distributed in a very small amount on the market because of its difficult synthesis and low productivity.

CITATION LIST

Patent Literature

PTL1: Japanese Patent Laid-Open No. 2004-83885
PTL2: Japanese Patent Laid-Open No. 2005-28524
PTL3: Japanese Patent Laid-Open No. 2000-204172

SUMMARY OF INVENTION

Technical Problem

An object of the present invention is to solve the aforementioned problems associated with the conventional techniques and to provide a novel method for producing a polyimide resin powder by which a polyimide resin can be obtained in a powder form using an aliphatic diamine, and a novel crystalline thermoplastic polyimide resin powder.

Solution to Problem

The present inventors have conducted diligent studies and consequently reached the present invention by finding that in the production of a polyimide resin using an aliphatic diamine as a raw material diamine component, a tetracarboxylic acid component can be reacted with the diamine component in the presence of a specific solvent to produce a polyimide resin in a powder form.

Specifically, the present invention provides a method for producing a polyimide resin powder, including the step of reacting (A) a tetracarboxylic acid component containing a tetracarboxylic dianhydride with (B) a diamine component containing an aliphatic diamine in the presence of (C) a solvent containing an alkylene glycol-based solvent represented by the formula (1):

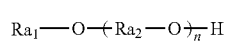
(1)

wherein $Ra_1$ represents a hydrogen atom or an alkyl group having from 1 to 4 carbon atoms, $Ra_2$ represents a linear alkylene group having from 2 to 6 carbon atoms, and n represents an integer of 1-3.

The present invention also provides a thermoplastic polyimide resin powder which is a powder of a thermoplastic polyimide resin containing a repeating unit represented by the following formula (I) and a repeating unit represented by the following formula (II), wherein the content ratio of the repeating unit of the formula (I) with respect to the total of the repeating unit of the formula (I) and the repeating unit of the formula (II) is 40 to 70 mol %, and the ratio of particles passing through a sieve with a mesh opening of 500 μm is 90 mass % or more:

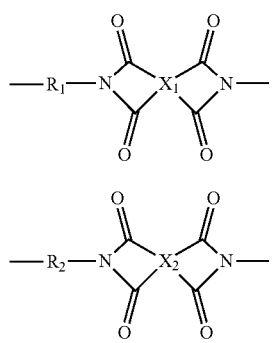

wherein $R_1$ represents a divalent group having from 6 to 22 carbon atoms containing at least one alicyclic hydrocarbon structure, $R_2$ represents a divalent chain aliphatic group having from 5 to 20 carbon atoms, and $X_1$ and $X_2$ each independently represent a tetravalent group having from 6 to 22 carbon atoms containing at least one aromatic ring.

Advantageous Effects of Invention

According to the present invention, in the production of a polyimide resin using an aliphatic diamine as a raw material diamine component, the polyimide resin can be formed in a powder form with few clumps. According to the present invention, a novel crystalline thermoplastic polyimide resin powder can also be obtained.

DESCRIPTION OF EMBODIMENTS

<Method for Producing Polyimide Resin Powder>

Figure 1:
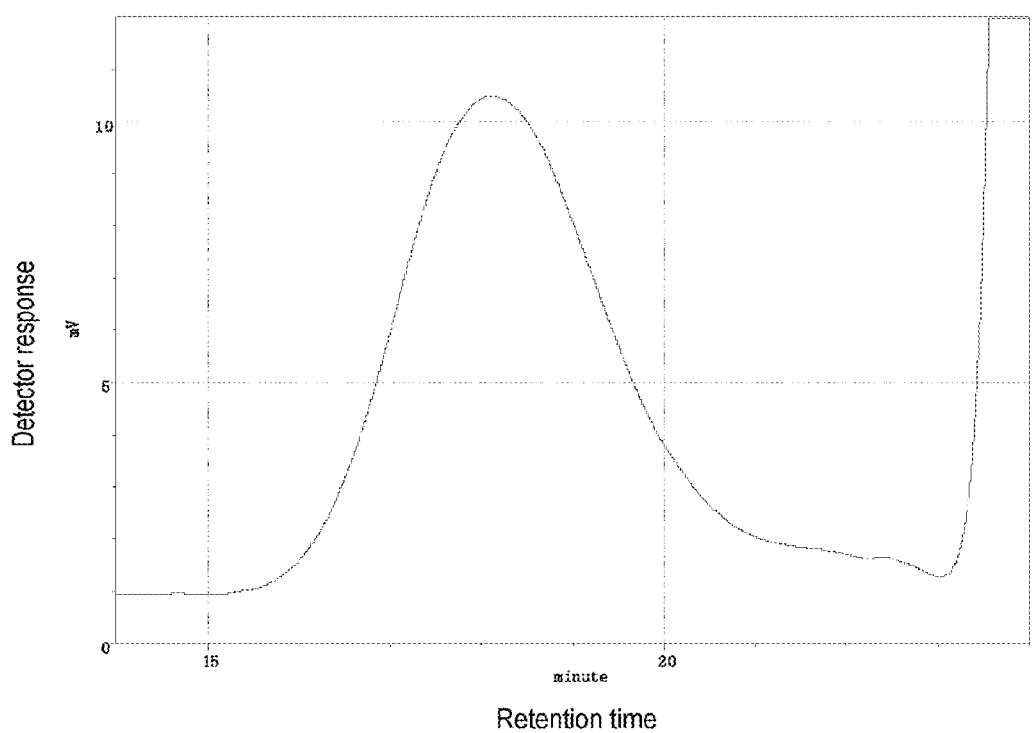
FIG. 1 is a GPC chart of a product obtained in Example 1.

The method for producing a polyimide resin powder according to the present invention includes the step of reacting (A) a tetracarboxylic acid component containing a tetracarboxylic dianhydride with (B) a diamine component containing an aliphatic diamine in the presence of (C) a solvent containing an alkylene glycol-based solvent represented by the formula (1):

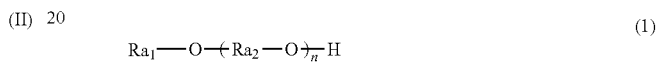

wherein $Ra_1$ represents a hydrogen atom or an alkyl group having from 1 to 4 carbon atoms, $Ra_2$ represents a linear alkylene group having from 2 to 6 carbon atoms, and n represents an integer of 1-3.

The solvent (C) contains an alkylene glycol-based solvent represented by the formula (1). In the production of a polyimide resin using an aliphatic diamine as a raw material diamine component, a tetracarboxylic acid component can be reacted with the diamine component in the presence of such a specific solvent to obtain a polyimide resin in a powder form.

For obtaining a polyimide resin in a homogeneous powder form, it is considered desirable that the solvent should possess two characteristics in one-pot reaction: (1) uniformly dissolving a polyamic acid or uniformly dispersing a nylon salt; and (2) neither dissolving nor swelling a polyimide resin. The solvent (C) substantially satisfies these two characteristics. If the characteristic (1) is incompletely met, aggregates or clumps are generated before imidization. If the characteristic (2) is incompletely met, aggregates or clumps are generated after imidization.

In the present invention, the "powder" and the "powder form" mean that the ratio of particles passing through a sieve with a nominal mesh opening of 500 μm for JIS tests is 90 mass % or more when subjected to a sieving test according to the method of JIS K0069.

The alkylene glycol-based solvent has a boiling point of preferably 140° C. or higher, more preferably 160° C. or higher, further preferably 180° C. or higher, from the viewpoint of permitting polymerization reaction under high temperature conditions at normal pressure.

In the formula (1), $Ra_1$ is a hydrogen atom or an alkyl group having from 1 to 4 carbon atoms, preferably an alkyl group having from 1 to 4 carbon atoms, more preferably a methyl group or an ethyl group.

In the formula (1), $Ra_2$ is a linear alkylene group having from 2 to 6 carbon atoms, preferably a linear alkylene group having from 2 or 3 carbon atoms, more preferably an ethylene group.

In the formula (1), n is an integer of 1-3, preferably 2-3.

Specific examples of the alkylene glycol-based solvent include ethylene glycol monomethyl ether, diethylene glycol monomethyl ether (also known as 2-(2-methoxyethoxy) ethanol), triethylene glycol monomethyl ether (also known as 2-[2-(2-methoxyethoxy)ethoxy]ethanol), ethylene glycol monoethyl ether, diethylene glycol monoethyl ether (also known as 2-(2-ethoxyethoxy)ethanol), ethylene glycol monoisopropyl ether, diethylene glycol monoisopropyl ether, triethylene glycol monoisopropyl ether, ethylene glycol monobutyl ether, diethylene glycol monobutyl ether, triethylene glycol monobutyl ether, ethylene glycol monoisobutyl ether, diethylene glycol monoisobutyl ether, ethylene glycol monoisobutyl ether, ethylene glycol, and 1,3-propanediol. These solvents may each be used alone, or two or more solvents selected from them may be used in combination. Of these solvents, 2-(2-methoxyethoxy)ethanol, 2-[2-(2-methoxyethoxy)ethoxy]ethanol, 2-(2-ethoxyethoxy)ethanol, and 1,3-propanediol are preferred, and 2-(2-methoxyethoxy)ethanol and 2-(2-ethoxyethoxy)ethanol are more preferred.

The content of the alkylene glycol-based solvent in the solvent (C) is preferably 30 mass % or more, more preferably 50 mass % or more, further preferably 75 mass % or more, particularly preferably 95 mass % or more. The solvent (C) may consist of the alkylene glycol-based solvent alone.

When the solvent (C) contains the alkylene glycol-based solvent and an additional solvent, specific examples of the "additional solvent" include water, benzene, toluene, xylene, acetone, hexane, heptane, chlorobenzene, methanol, ethanol, n-propanol, isopropanol, N-methyl-2-pyrrolidone, N,N-dimethylacetamide, N,N-diethylacetamide, N,N-dimethylformamide, N,N-diethylformamide, N-methylcaprolactam, hexamethylphosphoramide, tetramethylene sulfone, dimethyl sulfoxide, o-cresol, m-cresol, p-cresol, phenol, p-chlorophenol, 2-chloro-4-hydroxytoluene, diglyme, triglyme, tetraglyme, dioxane, γ-butyrolactone, dioxolane, cyclohexanone, cyclopentanone, dichloromethane, chloroform, 1,2-dichloroethane, 1,1,2-trichloroethane, dibromomethane, tribromomethane, 1,2-dibromoethane, and 1,1,2-tribromoethane. These solvents may each be used alone, or two or more solvents selected from them may be used in combination. The solvent (C) is preferably free from water, but may contain water within a range where a long-chain polyamic acid is formed as mentioned above. Specifically, the water content is preferably 10 mass % or less, more preferably 5 mass % or less, further preferably 1 mass % or less, particularly preferably 0 mass %.

It is preferred that the solvent (C) should contain from 5 to 10 mass % of γ-butyrolactone, because the obtained polyimide resin has an improved hue.

The diamine component (B) contains an aliphatic diamine. The present invention enables a polyimide resin to be produced as a powder in the production of a polyimide resin using an aliphatic diamine as a raw material diamine component. Use of the aliphatic diamine as a raw material diamine component imparts thermoforming molding processability to the polyimide resin powder.

Examples of the aliphatic diamine include a diamine containing at least one alicyclic hydrocarbon structure and a chain aliphatic diamine.

The diamine containing at least one alicyclic hydrocarbon structure is preferably (B1) a diamine represented by the following formula (B1-1):

$$H_2N-R_1-NH_2 \quad (B1\text{-}1)$$

wherein $R_1$ represents a divalent group having from 6 to 22 carbon atoms containing at least one alicyclic hydrocarbon structure.

In this context, the alicyclic hydrocarbon structure means a ring derived from an alicyclic hydrocarbon compound. The alicyclic hydrocarbon compound may be saturated or unsaturated and may be monocyclic or polycyclic.

Examples of the alicyclic hydrocarbon structure include, but are not limited to, cycloalkane rings such as a cyclohexane ring, cycloalkene rings such as cyclohexene, bicycloalkane rings such as a norbornane ring, and bicycloalkene rings such as norbornene. Among them, a cycloalkane ring is preferred, a cycloalkane ring having from 4 to 7 carbon atoms is more preferred, and a cyclohexane ring is further preferred.

The number of carbon atoms in $R_1$ is from 6 to 22, preferably from 8 to 17.

$R_1$ contains at least one alicyclic hydrocarbon structure and preferably contains from 1 to 3 alicyclic hydrocarbon structures.

$R_1$ is preferably a divalent group represented by the following formula (R1-1) or (R1-2), more preferably a divalent group represented by the following formula (R1-3):

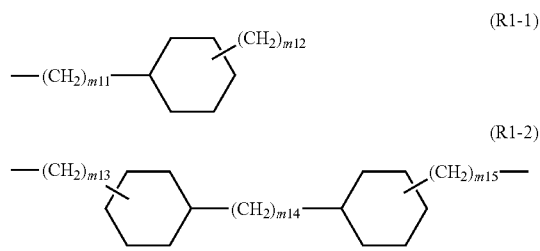

wherein $m_{11}$ and $m_{12}$ each independently represent an integer of 0-2, preferably 0 or 1, and $m_{13}$ to $m_{15}$ each independently represent an integer of 0-2, preferably 0 or 1;

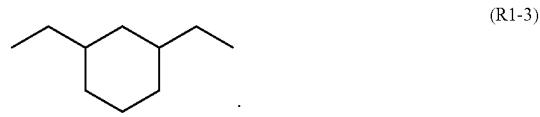

In the divalent group represented by the formula (R1-3), the positional relationship of two methylene groups with respect to the cyclohexane ring may be cis or trans, and the ratio between cis and trans can be any value.

The diamine (B1) is more preferably represented by the following formula (B1-2):

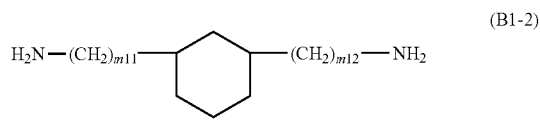

wherein $m_{11}$ and $m_{12}$ each independently represent an integer of 0-2, preferably 0 or 1.

Specific examples of the diamine (B1) include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), isophoronediamine, norbornanediamine, bis(aminomethyl)tricyclo[5.2.1.0(2,6)]decane, 3,3'-dimethyl-4,4'-diaminodicyclohexylmethane, and 4,4'-diaminodicyclohexylpropane. These compounds may each be used alone, or two or more compounds selected from them may be used in combination. Of them, 1,3-bis(aminomethyl)cyclohexane can be particularly preferably used. The diamine containing the alicyclic hydrocarbon structure generally has structural isomers, but is not limited by the ratio between cis and trans forms.

The chain aliphatic diamine is preferably (B2) a diamine represented by the following formula (B2-1):

$H_2N—R_2—NH_2$ (B2-1)

wherein $R_2$ represents a divalent chain aliphatic group having from 5 to 20 carbon atoms.

In this context, the chain aliphatic group means a group derived from a chain aliphatic compound. The chain aliphatic compound may be saturated or unsaturated, may be linear or branched, and may contain a heteroatom such as an oxygen atom.

$R_2$ is preferably an alkylene group having from 5 to 20 carbon atoms, more preferably an alkylene group having from 5 to 16 carbon atoms, further preferably an alkylene group having from 5 to 12 carbon atoms, still further preferably an alkylene group having from 6 to 10 carbon atoms. The alkylene group may be a linear alkylene group or a branched alkylene group and is preferably a linear alkylene group.

$R_2$ is particularly preferably a hexamethylene group.

Alternative examples of the preferred aspect of $R_2$ include divalent chain aliphatic groups each having from 5 to 20 carbon atoms (preferably from 5 to 16 carbon atoms, more preferably from 5 to 12 carbon atoms) containing an ether group. Among them, a divalent group represented by the following formula (R2-1) or (R2-2) is preferred:

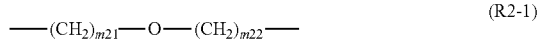

$—(CH_2)_{m21}—O—(CH_2)_{m22}—$ (R2-1)

$—(CH_2)_{m23}—O—(CH_2)_{m24}—O—(CH_2)_{m25}—$ (R2-2)

wherein $m_{21}$ and $m_{22}$ each independently represent an integer of 1-19, preferably 1-15, more preferably 1-11, further preferably 2-6, and $m_{23}$ to $m_{25}$ each independently represent an integer of 1-18, preferably 1-14, more preferably 1-10, further preferably 2-4.

Since $R_2$ is a divalent chain aliphatic group having from 5 to 20 carbon atoms (preferably from 5 to 16 carbon atom, more preferably from 5 to 12 carbon atoms), each of $m_{21}$ and $m_{22}$ in the formula (R2-1) is selected such that the number of carbon atoms in the divalent group represented by the formula (R2-1) falls within the range of from 5 to 20 (preferably 5 to 16, more preferably from 5 to 12). Specifically, $m_{21}+m_{22}$ is from 5 to 20 (preferably from 5 to 16, more preferably from 5 to 12).

Likewise, each of $m_{23}$ to $m_{25}$ in the formula (R2-2) is selected such that the number of carbon atoms in the divalent group represented by the formula (R2-2) falls within the range of from 5 to 20 (preferably from 5 to 16, more preferably from 5 to 12). Specifically, $m_{23}+m_{21}+m_{25}$ is from 5 to 20 (preferably from 5 to 16, more preferably from 5 to 12).

Specific examples of the diamine (B2) include 1,5-pentamethylenediamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine). These compounds may each be used alone, or two or more compounds selected from them may be used in combination. Of them, 1,6-hexamethylenediamine can be particularly preferably used.

The diamine component (B) preferably contains the aforementioned diamine (B1) and the aforementioned diamine (B2) as the aliphatic diamine.

The amount of the diamine (B1) with respect to the total amount of the diamine (B1) and the diamine (B2) is preferably from 40 to 70 mol %, more preferably from 40 to 60 mol %.

The diamine component (B) may consist of the aliphatic diamine alone or may contain a diamine containing an aromatic ring in addition to the aliphatic diamine.

The diamine containing an aromatic ring is preferably a diamine containing at least one aromatic ring, more preferably (B3) a diamine represented by the following formula (B3-1):

$H_2N—R_3—NH_2$ (B3-1)

wherein $R_3$ represents a divalent group having from 6 to 22 carbon atoms containing at least one aromatic ring.

The aromatic ring may be monocyclic or may be a condensed ring. Examples thereof include, but are not limited to, a benzene ring, a naphthalene ring, an anthracene ring, and a tetracene ring. Among them, a benzene ring and a naphthalene ring are preferred, and a benzene ring is more preferred.

The number of carbon atoms in $R_3$ is from 6 to 22, preferably from 6 to 18.

$R_3$ contains at least one aromatic ring and preferably contains from 1 to 3 aromatic rings.

The aromatic ring may be bonded to a monovalent or divalent electron-attracting group. Examples of the monovalent electron-attracting group include a nitro group, a cyano group, a p-toluenesulfonyl group, halogen, an alkyl halide group, a phenyl group, and an acyl group. Examples of the divalent electron-attracting group include alkylene halide groups such as alkylene fluoride groups (e.g., $—C(CF_3)_2—$ and $—(CF_2)_p—$ wherein p is an integer of 1-10) as well as $—CO—$, $—SO_2—$, $—SO—$, $—CONH—$, and $—COO—$.

$R_3$ is preferably a divalent group represented by the following formula (R3-1) or (R3-2):

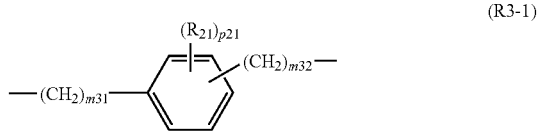
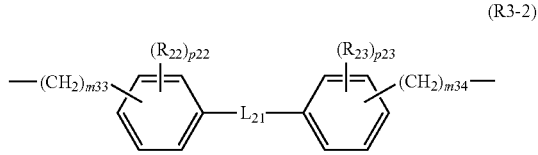

wherein $m_{31}$ and $m_{32}$ each independently represent an integer of 0-2, preferably 0 or 1, $m_{33}$ and $m_{34}$ each independently represent an integer of 0-2, preferably 0 or 1, $R_{21}$, $R_{22}$, and $R_{23}$ each independently represent an alkyl group having from 1 to 4 carbon atoms, an alkenyl group having from 2 to 4 carbon atoms, or an alkynyl group having from 2 to 4 carbon atoms, $p_{21}$, $p_{22}$, and $p_{23}$ each independently represent an integer of 0-4, preferably 0, and $L_{21}$ represents a single bond, an ether group, a carbonyl group, or an alkylene group having from 1 to 4 carbon atoms.

Since $R_3$ is a divalent group having from 6 to 22 carbon atoms containing at least one aromatic ring, each of $m_{31}$, $m_{32}$, $R_{21}$, and $p_{21}$ in the formula (R3-1) is selected such that the number of carbon atoms in the divalent group represented by the formula (R3-1) falls within the range of from 6 to 22.

Likewise, each of $L_{21}$, $m_{33}$, $m_{34}$, $R_{22}$, $R_{23}$, $p_{22}$, and $p_{23}$ in the formula (R3-2) is selected such that the number of carbon atoms in the divalent group represented by the formula (R3-2) falls within the range of from 12 to 22.

Specific examples of the diamine (B3) include ortho-xylylenediamine, meta-xylylenediamine, para-xylylenediamine, 1,2-diethynylbenzenediamine, 1,3-cliethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)1,4-diisopropylbenzene, α',α'-bis(3-aminophenyl)-1,4-diisopropylbenzene, 2,2'-bis[4-(4-aminophenoxy)phenyl]propane, 2,6-diaminonaphthalene, and 1,5-diaminonaphthalene.

When the diamine component (B) contains both of the aliphatic diamine and the diamine containing an aromatic ring, the diamine component (B) further contains the aforementioned diamine (B3) in addition to the aforementioned diamine (B1) and the aforementioned diamine (B2). The amount of the diamine (B3) with respect to the total amount of the diamine (B1) and the diamine (B2) is preferably 25 mol % or less. On the other hand, the lower limit is not particularly limited and needs only to exceed 0 mol %.

The diamine component (B) may contain (B4) a diamine represented by the following formula (B4-1):

$$H_2N-R_4-NH_2 \quad (B4-1)$$

wherein $R_4$ represents a divalent group containing $-SO_2-$ or $-Si(R_x)(R_y)O-$, and $R_x$ and $R_y$ each independently represent a chain aliphatic group having from 1 to 3 carbon atoms or a phenyl group.

The tetracarboxylic acid component (A) contains a tetracarboxylic dianhydride. The tetracarboxylic dianhydride is preferably a tetracarboxylic dianhydride containing at least one aromatic ring, more preferably a tetracarboxylic dianhydride represented by the formula (A-1):

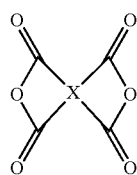

(A-1)

wherein X represents a tetravalent group having from 6 to 22 carbon atoms containing at least one aromatic ring.

X is a tetravalent group having from 6 to 22 carbon atoms containing at least one aromatic ring. The aromatic ring may be monocyclic or may be a condensed ring. Examples thereof include, but are not limited to, a benzene ring, a naphthalene ring, an anthracene ring, and a tetracene ring. Among them, a benzene ring and a naphthalene ring are preferred, and a benzene ring is more preferred.

The number of carbon atoms in X is from 6 to 22, preferably from 6 to 18.

X contains at least one aromatic ring and preferably contains from 1 to 3 aromatic rings.

X is preferably a tetravalent group represented by any of the following formulas (X-1) to (X-4):

(X-1)

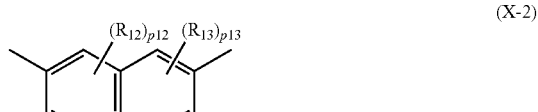

(X-2)

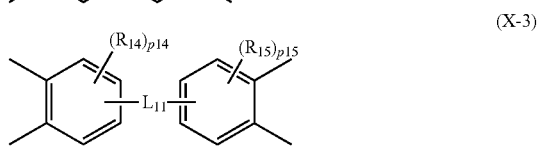

(X-3)

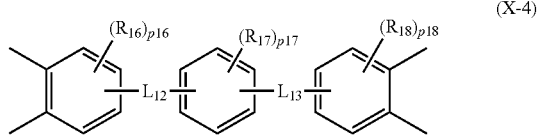

(X-4)

wherein $R_{11}$ to $R_{18}$ each independently represent an alkyl group having from 1 to 4 carbon atoms, $p_{11}$ to $p_{13}$ each independently represent an integer of 0-2, preferably 0, $p_{14}$, $p_{15}$, $p_{16}$, and $p_{18}$ each independently represent an integer of 0-3, preferably 0, $p_{17}$ represents an integer of 0-4, preferably 0, and $L_{11}$ to $L_{13}$ each independently represent a single bond, an ether group, a carbonyl group, or an alkylene group having from 1 to 4 carbon atoms.

Since X is a tetravalent group having from 6 to 22 carbon atoms containing at least one aromatic ring, each of $R_{12}$, $R_{13}$, $p_{12}$, and $p_{13}$ in the formula (X-2) is selected such that the number of carbon atoms in the tetravalent group represented by the formula (X-2) falls within the range of from 10 to 22.

Likewise, each of $L_{11}$, $R_{14}$, $R_{15}$, $p_{14}$, and $p_{15}$ in the formula (X-3) is selected such that the number of carbon atoms in the tetravalent group represented by the formula (X-3) falls within the range of 12 to 22. Each of $L_{12}$, $L_{13}$, $R_{16}$, $R_{17}$, $R_{18}$, $p_{16}$, $p_{17}$, and $p_{18}$ in the formula (X-4) is selected such that the number of carbon atoms in the tetravalent group represented by the formula (X-4) falls within the range of from 18 to 22.

X is particularly preferably a tetravalent group represented by the following formula (X-5) or (X-6):

(X-5)

(X-6)

Specific examples of the tetracarboxylic dianhydride include pyromellitic dianhydride, 2,3,5,6-toluenetetracarboxylic dianhydride, 3,3%4,4' diphenylsulfonetetracarboxylic dianhydride, 3,3',4,4'-benzophenonetetracarboxylic dianhydride, 3,3',4,4'-biphenyltetracarboxylic dianhydride, and 1,4,5,8-naphthalenetetracarboxylic dianhydride. These tetracarboxylic dianhydrides may each be used alone, or two or more thereof may be used in combination. Among them, pyromellitic dianhydride is particularly preferred.

The tetracarboxylic acid component (A) may contain a derivative of the tetracarboxylic dianhydride (a tetracarboxylic acid and/or an alkyl ester form of the tetracarboxylic acid) in addition to the tetracarboxylic dianhydride.

Examples of the tetracarboxylic acid include pyromellitic acid, 2,3,5,6-toluenetetracarboxylic acid, 3,3',4,4'-benzophenonetetracarboxylic acid, 3,3',4,4'-biphenyltetracarboxylic acid, and 1,4,5,8-naphthalenetetracarboxylic acid. Among them, pyromellitic acid is particularly preferred.

Examples of the alkyl ester form of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate, and dimethyl 1,4,5,8-naphthalenetetracarboxylate. In the alkyl ester form of the tetracarboxylic acid, the number of carbon atoms in the alkyl group is preferably 1 to 3.

These tetracarboxylic acids and their derivatives may each be used alone, or two or more thereof may be used in combination.

A smaller ratio of the tetracarboxylic acid in the tetracarboxylic acid component (A) is more preferred. The ratio of the tetracarboxylic acid in the tetracarboxylic acid component (A) is preferably 50 mol % or less, more preferably 30 mol % or less, particularly preferably 0 mol %.

For producing the polyimide resin powder, the ratio between the amounts of the tetracarboxylic acid component (A) and the diamine component (B) added is preferably 0.9 to 1.1 mol of the diamine component (B) with respect to 1 mol of the tetracarboxylic acid component (A).

In the method for producing a polyimide resin powder according to the present invention, an end capping agent may be mixed in addition to the tetracarboxylic acid component (A) and the diamine component (B). The end capping agent is preferably a monoamine or a dicarboxylic acid. When the end capping agent is introduced, the amount of the end capping agent added is preferably 0.0001 to 0.1 mol, particularly preferably 0.001 to 0.06 mol, with respect to 1 mol of the tetracarboxylic acid component (A). Examples of the monoamine end capping agent include methylamine, ethylamine, propylamine, butylamine, benzylamine, 4-methylbenzylamine, 4-ethylbenzylamine, 4-dodecylbenzylamine, 3-methylbenzylamine, 3-ethylbenzylamine, aniline, 3-methylaniline, and 4-methylaniline. Of them, benzylamine and aniline can be preferably used. The dicarboxylic acid end capping agent is preferably a dicarboxylic acid, a portion of which may be ring-closed. Examples thereof include phthalic acid, phthalic anhydride, 4-chlorophthalic acid, tetrafluorophthalic acid, 2,3-benzophenonedicarboxylic acid, 3,4-benzophenonedicarboxylic acid, cyclohexane-1,2-dicarboxylic acid, cyclopentane-1,2-dicarboxylic acid, and 4-cyclohexene-1,2-dicarboxylic acid. Of them, phthalic acid and phthalic anhydride can be preferably used.

In the method for producing a polyimide resin powder according to the present invention, the method of reacting the tetracarboxylic acid component (A) with the diamine component (B) to synthesize a polyimide resin is not limited as long as the reaction is carried out in the presence of the specific solvent (C). Examples thereof include a method which involves adding both of the tetracarboxylic acid component (A) and the diamine component (B) into the specific solvent (C) and heating (preferably 150° C. or higher, more preferably from 180° C. to 250° C.) the mixture to synthesize a polyimide resin. The polymerization time is appropriately changed according to the monomers used and is preferably on the order of from 0.5 to 6 hours.

In an alternative preferred aspect, the method involves separately preparing (a) a solution containing the tetracarboxylic acid component (A) in the specific solvent (C) and (b) a solution containing the diamine component (B) in the specific solvent (C), then adding the solution (b) to the solution (a) or adding the solution (a) to the solution (b) to prepare (c) a solution containing a polyamic acid, and subsequently imidizing the polyamic acid by heating the solution (c) to synthesize a polyimide resin.

The reaction of the tetracarboxylic acid component (A) with the diamine component (B) may be carried out under normal pressure or under increased pressure. The reaction under normal pressure is preferred because a pressure-resistant container is unnecessary.

Incidentally, the synthesis reaction of a compound requires suppressing the generation of impurities typified by by-products. This also holds true for the polyimide resin production. As described in, for example, Japanese Patent Laid-Open No. 2009-286868, cyclic oligomers may also be generated as by-products in the polyimide resin production. For the present invention as well, it is therefore desirable to suppress the generation of by-products.

In the method for producing a polyimide resin powder according to the present invention, preferably, the step of reacting the tetracarboxylic acid component (A) with the diamine component (B) includes: step (i) of adding (b) a solution containing the diamine component (B) to (a) a solution containing the tetracarboxylic acid component (A) to prepare (c) a solution containing a polyamic acid; and step (ii) imidizing the polyamic acid by heating the solution (c) to obtain a polyimide resin, wherein in the step (i), the solution (b) is added to the solution (a) such that the amount of the diamine component (B) added per unit time with respect to 1 mol of the tetracarboxylic acid component (A) is 0.1 mol/min or lower, from the viewpoint of reducing the amount of by-products.

For suppressing the generation of cyclic oligomers as by-products, it is desirable that in the step (i), the rate of addition of the solution (b) to the solution (a) should be controlled such that the amount of the diamine component (B) added per unit time with respect to 1 mol of the tetracarboxylic acid component (A) is 0.1 mol/min or lower. The mechanism under which the generation of by-products can be suppressed by controlling the rate of addition of the solution (b) to the solution (a) to the rate mentioned above is not completely clear, but is probably as follows: the gradual addition of the diamine component prevents the formation of a strong polyamic acid salt and instead forms a long-chain polyamic acid. Provided that this long-chain polyamic acid can be thermally imidized without causing hydrolysis, a long-chain polyimide is obtained without generating cyclic oligomers. On the other hand, the rapid addition of diamines yields a large number of short-chain polyamic acids as a large majority of diamines fall into the state of a polyamic acid salt. Such short-chain polyamic acids tend to form cyclic oligomers, because the probability of assuming cyclic configuration is inevitably increased. Specifically, the rate of addition of the solution (b) to the solution (a) is accelerated, and the amount of the diamine component (B) added per unit time with respect to 1 mol of the tetracarboxylic acid component (A) is 0.1 mol/min or lower, thereby hindering the generation of cyclic oligomers. In addition, problems can also be suppressed, such as impossible stirring attributed to the deposition of a strong polyamic acid salt and runaway reaction caused by strong reaction heat. The rate of addition of the solution (b) to the solution (a) may be slow from the viewpoint of suppressing the generation of cyclic oligomers. The lower limit of the amount of the diamine component (B) added per unit time with respect to 1 mol of the tetracarboxylic acid component (A) is not particularly limited. However, from the viewpoint of productivity or because of the possible occurrence of the hydrolysis of the polyamic acid attributed to long-term retention, it is preferred that the solution (b) should be added to the solution (a) such that the amount of the diamine component (B) added per unit time with respect to 1 mol of the tetracarboxylic acid component (A) is 0.005 mol/min or higher.

As mentioned above, for suppressing the generation of cyclic oligomers, it is preferred to form a long-chain polyamic acid at the first stage. The polymerization solvent is preferably a solvent that can sufficiently dissolve the polyamic acid and secure solution viscosity by which a homogeneous reaction system can be maintained. In the method for producing a polyimide resin powder according to the present invention, the tetracarboxylic acid component (A) is reacted with the diamine component (B) in the presence of the solvent (C). The polyamic acid can therefore be sufficiently dissolved, and a homogeneous reaction system can be maintained.

The solution (a) comprises (A) the tetracarboxylic acid component containing a tetracarboxylic dianhydride. The solution (a) preferably comprises the tetracarboxylic acid component (A) in the solvent (C). The content of the tetracarboxylic acid component (A) in the solution (a) is preferably a higher concentration within a range that permits uniform stirring. Specifically, the content is preferably from 20 to 45 mass %, more preferably from 25 to 45 mass %.

The solution (b) comprises (B) the diamine component containing an aliphatic diamine. The solution (b) preferably comprises the diamine component (B) in the solvent (C). The content of the diamine component (B) in the solution (b) is not particularly limited as long as the solution (b) can be gradually added. The content is preferably from 20 to 80 mass %, more preferably from 40 to 60 mass %.

As described above, the solvent (C) is preferably contained in the solution (a) and the solution (b). Thus, preferably, the step of reacting the tetracarboxylic acid component (A) with the diamine component (B) includes: step (i) of adding (b) a solution containing the diamine component (B) and the alkylene glycol-based solvent to (a) a solution containing the tetracarboxylic acid component (A) and the alkylene glycol-based solvent to prepare (c) a solution containing a polyamic acid; and step (ii) imidizing the polyamic acid by heating the solution (c) to obtain a polyimide resin, wherein in the step (i), the solution (b) is added to the solution (a) such that the amount of the diamine component (B) added per unit time with respect to 1 mol of the tetracarboxylic acid component (A) is 0.1 mol/min or lower.

In the method for producing a polyimide resin powder according to the present invention, since the tetracarboxylic acid component (A) contains a tetracarboxylic dianhydride, the generation of cyclic oligomers as by-products can be suppressed. The mechanism thereof is not completely clear. However, this is probably because: as mentioned above, for suppressing the generation of cyclic oligomers, it is required to form a long-chain polyamic acid at the first stage; and the tetracarboxylic dianhydride is capable of forming the long-chain polyamic acid.

The ratio of the tetracarboxylic dianhydride in the tetracarboxylic acid component (A) is preferably 50 mol % or more, more preferably 70 mol % or more, further preferably 90 mol % or more. The tetracarboxylic acid component (A) particularly preferably consists substantially of the tetracarboxylic dianhydride alone. In this context, the term "substantially" means that when only the tetracarboxylic dianhydride is used as the tetracarboxylic acid component (A), the ring opening of a portion (up to approximately 10 mol %) thereof through the reaction with water in an atmosphere is accepted.

In the step (i), the addition of the solution (b) to the solution (a) is preferably terminated when the total amount of the diamine component (B) added with respect to 1 mol of the tetracarboxylic acid component (A) reaches from 0.9 to 1.1 mol.

In the case of using an end capping agent, the end capping agent can be added in the step (i) after the addition of the solution (b) to the solution (a). The type of the end capping agent and the amount of the end capping agent added, and their preferred aspects are as already described above.

In the step (ii), the polyamic acid is imidized by heating the solution (c) containing the polyamic acid prepared in the step (i) to obtain a polyimide resin.

As a result of heating the solution (c), the deposition of a polyimide resin powder and dehydration caused by imidization are usually confirmed at a solution temperature on the order of from 120 to 150° C. For completing the imidization, however, it is preferred to heat the solution until the solution temperature reaches preferably 150° C. or higher, more preferably from 180° C. to 250° C. and to keep the solution at this temperature for approximately from 0.5 to 6 hours. Water generated by the imidization does not have to be removed, but is preferably removed.

As already mentioned above, the reaction of the tetracarboxylic acid component (A) with the diamine component (B) can be carried out under normal pressure or under increased pressure. Thus, the steps (i) and (ii) can be carried out under normal pressure or under increased pressure. The steps (i) and (ii) under normal pressure are preferred because a pressure-resistant container is unnecessary.

Since the step of reacting the tetracarboxylic acid component (A) with the diamine component (B) includes the steps (i) and (ii), the generation of by-products can be suppressed. The area ratio of a peak in a low-molecular-weight region (a peak whose peak top is present at a molecular weight of 1000 or smaller) can be 2 area % or less when the product obtained by the production method of the present invention is measured by gel permeation chromatography.

The polyimide resin produced by the method of the present invention is preferably a thermoplastic polyimide resin containing a repeating unit represented by the following formula (I) and a repeating unit represented by the following formula (II), wherein the content ratio of the repeating unit of the formula (I) with respect to the total of the repeating unit of the formula (I) and the repeating unit of the formula (II) is from 40 to 70 mol %:

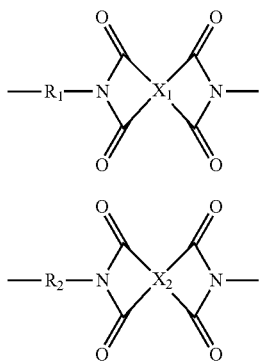

(I)

(II)

wherein $R_1$ represents a divalent group having from 6 to 22 carbon atoms containing at least one alicyclic hydrocarbon structure, $R_2$ represents a divalent chain aliphatic group having from 5 to 20 carbon atoms, and $X_1$ and $X_9$ each independently represent a tetravalent group having from 6 to 22 carbon atoms containing at least one aromatic ring.

$R_1$ and $R_2$ are as defined for $R_1$ in the formula (B1-1) and $R_2$ in the formula (B2-1), respectively, and their preferred aspects are also as described above. $X_1$ and $X_2$ will be described later.

The polyimide resin having the constitution as described above is a heat fusion-moldable crystalline thermoplastic polyimide resin that also has a high glass transition temperature of 170° C. or higher (preferably 200° C. or higher) in spite of its low melting point of 360° C. or lower.

Hereinafter, the thermoplastic polyimide resin powder of the present invention will be described.

<Thermoplastic Polyimide Resin Powder>

The thermoplastic polyimide resin powder of the present invention is a powder of a thermoplastic polyimide resin containing a repeating unit represented by the following formula (I) and a repeating unit represented by the following formula (II), wherein the content ratio of the repeating unit of the formula (I) with respect to the total of the repeating unit of the formula (I) and the repeating unit of the formula (II) is from 40 to 70 mol %, and the ratio of particles passing through a sieve with a mesh opening of 500 μm is 90 mass % or more:

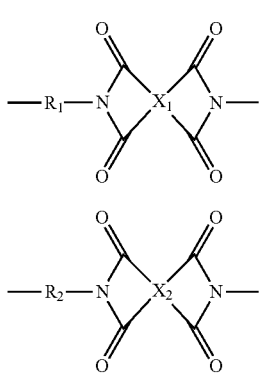

(I)

(II)

wherein $R_1$ represents a divalent group having from 6 to 22 carbon atoms containing at least one alicyclic hydrocarbon structure, $R_2$ represents a divalent chain aliphatic group having from 5 to 20 carbon atoms, and $X_1$ and $X_2$ each independently represent a tetravalent group having from 6 to 22 carbon atoms containing at least one aromatic ring.

The thermoplastic polyimide resin powder having the constitution as described above is a novel crystalline thermoplastic polyimide resin powder and is a powder form, suitable for thermoforming molding process or the like, of a thermoplastic polyimide resin that also has a high glass transition temperature of 170° C. or higher (preferably 200° C. or higher) in spite of its low melting point of 360° C. or lower.

In the thermoplastic polyimide resin powder of the present invention, the ratio of particles passing through a sieve with a nominal mesh opening of 500 μm for JIS tests is 90 mass % or more when subjected to a sieving test according to the method of JIS K0069. Preferably, the ratio of particles passing through a sieve with a nominal mesh opening of 250 μm is 90 mass % or more. The thermoplastic polyimide resin powder of the present invention having such a particle size has a large number of advantages that: for example, uneven processing is less likely to occur during molding; the thermoplastic polyimide resin powder is easily delivered; the thermoplastic polyimide resin powder is highly dispersible when used as a filler; and the drying time can be shortened.

The thermoplastic polyimide resin powder of the present invention has D10 of preferably from 10 to 100 μm, D50 of preferably from 15 to 250 μm, and D90 of preferably from 20 to 500 μm in particle size measurement using a laser diffraction light scattering-type particle size distribution measurement apparatus. The thermoplastic polyimide resin powder of the present invention having a particle size in such ranges also has advantages such as favorable filterability and suppressed floating of particles, in addition to the aforementioned advantages.

In the thermoplastic polyimide resin powder of the present invention, the value of D10 with respect to the value of D50 (D10/D50) in the particle size measurement using a laser diffraction light scattering-type particle size distribution measurement apparatus is preferably ⅓ or more, more preferably ½ or more. The value of D90 with respect to the value of D50 (D90/D50) is preferably 3 or less, more preferably 2 or less. The resin powder having particle size distribution in such ranges has a very narrow particle size range, and conditions for its handling are easily set. Also, this resin powder is highly stable during pneumatic conveyance and is less likely to be inhomogeneous when used as a filler.

For the thermoplastic polyimide resin powder of the present invention, the particle size measurement using a laser diffraction light scattering-type particle size distribution measurement apparatus is carried out using LMS-2000e (manufactured by Seishin Enterprise Co., Ltd.) and water as a dispersion medium in a state where the polyimide powder is sufficiently dispersed in the dispersion medium. The measurement range is set to from 0.02 to 2000 μm.

The thermoplastic polyimide resin powder of the present invention has an average circularity of preferably from 0.800 to 1.000, more preferably from 0.850 to 1.000, determined by imaging-type particle size distribution measurement.

In the imaging-type particle size distribution measurement, FPIA-3000 manufactured by Malvern Instruments Ltd. is used. In the imaging-type particle size measurement, particles are directly measured using a camera, and the circularity is determined according to the expression given below. The circularity is an index that is measured from 0 to 1.000 with 1.000 defined as a true circle.

Circularity=Perimeter of a true circle having the same area as that of the imaged particle/Perimeter of the imaged particle The measurement is carried out under conditions where the powder to be measured is sufficiently dispersed under ultrasonic conditions by using a 0.2 wt % aqueous sodium hexametaphosphate solution as a dispersion medium and adding 10 drops of a 10 wt % aqueous triton X-100 solution as a surfactant. The measurement range is set to from 0.5 to 200 μm.

In the repeating unit of the formula (I), $R_1$ is a divalent group having from 6 to 22 carbon atoms containing at least one alicyclic hydrocarbon structure. $R_1$ is as defined for $R_1$ in the formula (B1-1), and its preferred aspect is also as described above. $X_1$ is a tetravalent group having from 6 to 22 carbon atoms containing at least one aromatic ring. $X_1$ is as defined for X in the formula (A-1), and its preferred aspect is also as described above.

In the repeating unit of the formula (II), $R_2$ is a divalent chain aliphatic group having from 5 to 20 carbon atoms. $R_2$ is as defined for $R_2$ in the formula (B2-1), and its preferred aspect is also as described above. $X_2$ is as defined for $X_1$ in the formula (I), and its preferred aspect is also as described above.

The content ratio of the repeating unit of the formula (I) with respect to the total of the repeating unit of the formula (I) and the repeating unit of the formula (II) is 40 to 70 mol %. When the content ratio of the repeating unit of the formula (I) falls within the aforementioned range, the crystallization rate of the thermoplastic polyimide resin is as fast as 60 seconds or shorter in terms of the crystallization half-time, which enables the thermoplastic polyimide resin according to the present invention to be sufficiently crystallizable even in general injection molding cycles. The content ratio of the repeating unit of the formula (I) with respect to the total of the repeating unit of the formula (I) and the repeating unit of the formula (II) is preferably from 40 to 60 mol %.

In the thermoplastic polyimide resin powder of the present invention, the total content ratio of the repeating unit of the formula (I) and the repeating unit of the formula (II) to all repeating units constituting the thermoplastic polyimide resin is preferably from 50 to 100 mol %, more preferably from 75 to 100 mol %.

In the thermoplastic polyimide resin powder of the present invention, the thermoplastic polyimide resin may further contain a repeating unit of the formula (III) given below. In this case, the content ratio of the repeating unit of the formula (III) with respect to the total of the repeating unit of the formula (I) and the repeating unit of the formula (II) is 25 mol % or less. On the other hand, the lower limit is not particularly limited and needs only to exceed 0 mol %.

The content ratio is preferably 5 mol % or more, more preferably 10 mol % or more, from the viewpoint of improving heat resistance, and on the other hand, preferably 20 mol % or less, more preferably 15 mol % or less, from the viewpoint of maintaining crystallinity.

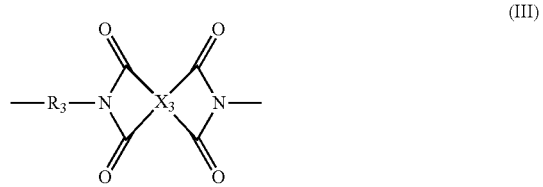

(III)

wherein $R_3$ represents a divalent group having from 6 to 22 carbon atoms containing at least one aromatic ring, and $X_3$ represents a tetravalent group having from 6 to 22 carbon atoms containing at least one aromatic ring.

$R_3$ is a divalent group having from 6 to 22 carbon atoms containing at least one aromatic ring. $R_3$ is as defined for $R_3$ in the formula (B3-1), and its preferred aspect is also as described above.

$X_3$ is as defined for $X_1$ in the formula (1), and its preferred aspect is also as described above.

The content ratio of the repeating unit of the formula (III) to all repeating units constituting the thermoplastic polyimide resin of the present invention is preferably 25 mol % or less. On the other hand, the lower limit is not particularly limited and needs only to exceed 0 mol %.

The content ratio is preferably 5 mol % or more, more preferably 10 mol % or more, from the viewpoint of improving heat resistance, and on the other hand, preferably 20 mol % or less, more preferably 15 mol % or less, from the viewpoint of maintaining crystallinity.

In the thermoplastic polyimide resin powder of the present invention, the thermoplastic polyimide resin may further contain a repeating unit of the following formula (IV):

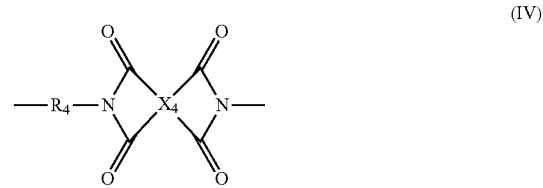

(IV)

wherein $R_4$ represents a divalent group containing —$SO_2$— or —$Si(R_x)(R_y)O$—, $R_x$ and $R_y$ each independently represent a chain aliphatic group having from 1 to 3 carbon atoms or a phenyl group, and $X_4$ represents a tetravalent group having from 6 to 22 carbon atoms containing at least one aromatic ring.

In the thermoplastic polyimide resin powder of the present invention, the thermoplastic polyimide resin preferably has a melting point of 360° C. or lower and has a glass transition temperature of 170° C. or higher (preferably 200° C. or higher).

In the thermoplastic polyimide resin powder of the present invention, the amount of heat at the exothermic peak of crystallization of the thermoplastic polyimide resin observed in a differential scanning calorimeter is preferably 5 mJ/mg or higher when the temperature is decreased at a cooling rate of 10° C./min or more after fusion.

The thermoplastic polyimide resin powder of the present invention can be produced by the already-mentioned method for producing a polyimide resin powder according to the present invention. The components used in the production method are as already mentioned above. The tetracarboxylic acid component (A) and the diamine component (B) for use in the production of the thermoplastic polyimide resin powder of the present invention are preferably used in the following forms:

The tetracarboxylic acid component (A) preferably contains a tetracarboxylic dianhydride containing at least one aromatic ring.

The tetracarboxylic dianhydride containing at least one aromatic ring is preferably a compound in which four carboxyl groups are bonded directly to the aromatic ring, and may contain an alkyl group in its structure. Also, the tetracarboxylic dianhydride preferably has 6 to 38 carbon atoms.

The tetracarboxylic acid component (A) may contain a derivative of the tetracarboxylic dianhydride containing at least one aromatic ring, in addition to the tetracarboxylic dianhydride containing at least one aromatic ring. Examples of the derivative of the tetracarboxylic dianhydride containing at least one aromatic ring include a tetracarboxylic acid containing at least one aromatic ring and/or its derivative. The tetracarboxylic acid containing at least one aromatic ring preferably has from 6 to 26 carbon atoms. Also, an alkyl ester form of the tetracarboxylic acid containing at least one aromatic ring preferably has from 6 to 38 carbon atoms.

Specific examples of the tetracarboxylic dianhydride containing at least one aromatic ring and its derivative include the compounds listed in the already-mentioned method for producing a polyimide resin powder according to the present invention.

In the diamine component (B), the molar ratio of the added amount of the diamine containing at least one aromatic ring to the total amount of the diamine containing at least one alicyclic hydrocarbon structure and the chain aliphatic diamine is preferably 25 mol % or less. On the other hand, the lower limit is not particularly limited and needs only to exceed 0 mol %.

The molar ratio is preferably 5 mol % or more, more preferably 10 mol % or more, from the viewpoint of improving heat resistance, and on the other hand, preferably 20 mol % or less, more preferably 15 mol % or less, from the viewpoint of maintaining crystallinity.

The thermoplastic polyimide resin powder of the present invention is essentially a homogeneous powder that is fused at a temperature of 360° C. or lower and as such, is suitable for various thermoforming molding techniques. Examples of the thermoforming molding methods include injection molding, extrusion molding, blow molding, hot press molding, vacuum molding, air-pressure molding, laser molding, welding, and seizing. As for a molding method through a heat fusion step, the thermoplastic polyimide resin powder of the present invention can be molded by any method. Examples of the shape of the molded article include injection-molded articles, extrusion-molded articles, films, sheets, strands, pellet, fiber, round bars, square bars, balls, pipes, tubes, and seamless belts. The thermoplastic polyimide resin of the present invention can be used as a heat-resistant adhesive by heating or pressurization and as such, can be used in flexible substrates, copper-clad laminates, or the like.

Furthermore, the thermoplastic polyimide resin powder of the present invention has a controllable particle size and sharp particle size distribution and as such, can be used in fillers for improvement in heat resistance, fillers for improvement in sliding, resin pastes, resin materials for fiber impregnation, resin materials for fabric impregnation, resin materials for 3D printers, materials for compression molding, or the like.

Examples

Hereinafter, the present invention will be described in more detail with reference to Examples. However, the present invention is not intended to be limited by them. The evaluation of physical properties in each Example was conducted by measurement according to methods given below.
<Evaluation 1>

In Examples 1 to 6 and Comparative Examples 1 to 5, the basic evaluation of polyimide resin powder production was conducted by methods given below.

1) Logarithmic Viscosity $\mu$

For the logarithmic viscosity $\mu$ each obtained polyimide was dried at from 190 to 200° C. for 2 hours, and 0.100 g of the polyimide was then dissolved in 20 mL of concentrated sulfuric acid (96%, manufactured by Kanto Chemical Co., Inc.) and measured at 30° C. using a Cannon-Fenske viscometer. The logarithmic viscosity $\mu$ was determined according to the following expression:

$\mu = \ln(ts/t_0)/C$ $t_0$: Time for which a solvent flows
$ts$: Time for which a dilute polymer solution flows
$C$: 0.5 g/dL 2) Melting Point, Glass Transition Temperature, and Crystallization Temperature of Polyimide Resin The melting point, glass transition temperature, and crystallization temperature of each polyimide resin were measured using a differential scanning calorimeter apparatus (DSC-6220) manufactured by SII NanoTechnology Inc. In a nitrogen atmosphere, the thermoplastic polyimide resin was subjected to heat history under the following conditions: the heat history conditions involved a heating rate 10° C./min for the first temperature increase, a cooling rate of 20° C./min for subsequent cooling, and then a heating rate 10° C./min for the second temperature increase. The melting point of the present invention is determined by reading the peak top value of an endothermic peak observed in the first temperature increase or the second temperature increase. The glass transition temperature is determined by reading the value observed in the first temperature increase or the second temperature increase. The crystallization temperature is determined by reading the peak top value of an exothermic peak observed in the first temperature decrease. In Examples, the melting point of the first temperature increase is indicated by $Tm_0$; the melting point of the second temperature increase is indicated by $Tm$; the glass transition temperature of the first temperature increase is indicated by $Tg_0$; the glass transition temperature of the second temperature increase is indicated by $Tg$; the crystallization temperature of the first temperature increase is indicated by $Tc_0$; and the crystallization temperature of the first temperature decrease is indicated by $Tc$.

3) Crystallization Half-Time

The crystallization half-time was evaluated using a differential scanning calorimeter apparatus (DSC-6220) manufactured by SII NanoTechnology Inc. A crystallization half-time of 20 seconds or shorter was determined under measurement conditions involving holding at 420° C. for 10 min in a nitrogen atmosphere for complete fusion of the resin followed by quenching operation at a cooling rate of 70° C./min, during which the time required for an observed crystallization peak from appearance to peak top was calculated.

4) 1% Decomposition Temperature

The 1% decomposition temperature was measured at a heating rate 10° C./min in an air atmosphere using a simultaneous thermogravimetry and differential thermal analysis apparatus (TG/DTA-6200) manufactured by SII NanoTechnology Inc. and indicated by a temperature at which 1% decrease in weight with respect to the initial weight occurred.

5) IR Measurement (Confirmation of Imidization)

The IR measurement was carried out using JIR-WIN-SPEC50 manufactured by JEOL Ltd.

6) Confirmation of Particle Size by Sieving

The confirmation of a particle size by sieving (sieving-type classification assay) was conducted according to the method of JIS K0069 using a sieve for JIS tests with a nominal mesh opening of 500 μm or a nominal mesh opening of 250 μm.

Example 1

650 g of 2-(2-methoxyethoxy)ethanol (manufactured by Nippon Nyukazai Co., Ltd.) and 257.75 g (1.180 mol) of pyromellitic dianhydride (manufactured by Mitsubishi Gas Chemical Co., Inc.) were introduced into a 2 L separable flask equipped with a Dean-Stark apparatus, a Liebig condenser tube, a thermocouple, and a four-paddle blade. After creation of a nitrogen flow, the mixture was stirred at 150 rpm so as to become a homogeneous suspended solution. On the other hand, 83.96 g (0.5902 mol) of 1,3-bis(aminomethyl)cyclohexane (manufactured by Mitsubishi Gas Chemical Co., Inc.), 54.86 g (0.4722 mol) of 1,6-hexamethylenediamine (manufactured by Wako Pure Chemical Industries, Ltd.), and 23.64 g (0.1180 mol) of 4,4'-diaminodiphenyl ether (manufactured by Wakayama Seika Kogyo Co., Ltd.) were dissolved in 250 g of 2-(2-methoxyethoxy)ethanol using a 500-mL beaker to prepare a mixed diamine solution. This mixed diamine solution was added dropwise over 60 min to the suspended solution in the 2 L separable flask using a plunger pump. This dropwise addition was carried out in a nitrogen flow state over the whole period. The number of rotations of the stirring blade was set to 250 rpm. The peak exothermic temperature during the dropwise addition was 65° C. After the completion of the dropwise addition, 100 g of 2-(2-methoxyethoxy)ethanol and 1.897 g (0.0177 mol) of benzylamine (manufactured by Kanto Chemical Co., Inc.) were added thereto, and the mixture was further stirred. At this stage, a yellow clear homogenous polyamic acid solution was obtained. Next, the stirring speed was set to 200 rpm, and the polyamic acid solution in the 2 L separable flask was then heated to 190° C. In this heating process, the deposition of a polyimide powder and dehydration associated with imidization were confirmed at a solution temperature from 130 to 150° C. The solution was kept at 190° C. for 30 minutes, then allowed to cool to room temperature, and filtered. The obtained polyimide powder was washed with 300 g of 2-(2-methoxyethoxy)ethanol and 300 g of methanol (manufactured by Mitsubishi Gas Chemical Co., Inc.), filtered, and then dried at 190° C. for 10 hours in a drier to obtain 360 g of polyimide powder 1.

As a result of DSC measurement, only $Tm_0$ was observed at 338° C. in the first temperature increase, whereas neither $Tg_0$ nor $Tc_0$ was distinctly observed (which means that the polyimide powder had a high degree of crystallinity). At the time of cooling, Tc was observed at 308° C. (amount of heat generation: 12.0 mJ/mg), confirming that the polyimide powder had high crystallinity. Tg and Tm were observed at 226° C. and 335° C., respectively, in the second temperature increase.

The crystallization half-time was measured and consequently determined as 20 seconds or shorter. The 1% decomposition temperature was 411° C., and the logarithmic viscosity was 0.63 dL/g.

As a result of measuring the IR spectrum, the characteristic absorption of the imide ring was observed at ν (C=O) 1771, 1699 (cm$^{-1}$). According to the method of JIS K0069, when the polyimide powder 1 was sifted through a sieve with a mesh opening of 500 μm, 99 mass % or more of particles passed through the sieve. When the polyimide powder 1 was sifted through a sieve with a mesh opening of 250 μm, 99 mass % or more of particles passed through the sieve.

Example 2

650 g of 2-(2-methoxyethoxy)ethanol (manufactured by Nippon Nyukazai Co., Ltd.) and 257.75 g (1.180 mol) of pyromellitic dianhydride (manufactured by Mitsubishi Gas Chemical Co., Inc.) were introduced into a 2 L autoclave equipped with a thermocouple and a four-paddle blade. After creation of a nitrogen flow, the mixture was stirred at 150 rpm so as to become a homogeneous suspended solution. On the other hand, 83.96 g (0.5902 mol) of 1,3-bis(aminomethyl)cyclohexane (manufactured by Mitsubishi Gas Chemical Co., Inc.), 54.86 g (0.4722 mol) of 1,6-hexamethylenediamine (manufactured by Wako Pure Chemical Industries, Ltd.), and 23.64 g (0.1180 mol) of 4,4'-diaminodiphenyl ether (manufactured by Wakayama Seika Kogyo Co., Ltd.) were dissolved in 250 g of 2-(2-methoxyethoxy)ethanol using a 500-mL beaker to prepare a mixed diamine solution. This mixed diamine solution was added dropwise over 60 min to the suspended solution in the 2 L autoclave using a plunger pump. This dropwise addition was carried out in a nitrogen flow state over the whole period. The number of rotations of the stirring blade was set to 250 rpm. After the completion of the dropwise addition, 100 g of 2-(2-methoxyethoxy)ethanol and 1.897 g (0.0177 mol) of benzylamine (manufactured by Kanto Chemical Co., Inc.) were added thereto, and the mixture was further stirred for 10 minutes. At this stage, a yellow clear homogenous polyamic acid solution was obtained. Next, the autoclave was hermetically sealed, and the stirring speed was set to 100 rpm. Then, the polyamic acid solution in the 2 L autoclave was heated to 190° C. When imidization occurs with heating, water is supposed to be generated. This water was wholly enclosed in the system. During the heating, the internal pressure was elevated to 0.3 MPaG. The solution was kept at 190° C. for 30 minutes, then allowed to cool to room temperature, and filtered. The obtained polyimide powder was washed with 300 g of 2-(2-methoxyethoxy)ethanol and 300 g of methanol (manufactured by Mitsubishi Gas Chemical Co., Inc.), filtered, and then dried at 190° C. for 10 hours in a drier to obtain 365 g of polyimide powder 2. Its thermophysical properties, crystallization half-time, logarithmic viscosity, and IR spectrum did not largely differ from those of the polyimide powder 1. According to the method of JIS K0069, when the polyimide powder 2 was sifted through a sieve with a mesh opening of 500 μm, 99 mass % or more of particles passed through the sieve. When the polyimide powder 2 was sifted through a sieve with a mesh opening of 250 μm, 99 mass % or more of particles passed through the sieve.

Example 3

363 g of polyimide powder 3 was obtained by synthesis and workup in the same way as in Example 1 except that the polymerization solvent (2-(2-methoxyethoxy)ethanol) of Example 1 was changed to a mixed solvent of 2-(2-methoxyethoxy)ethanol/γ-butyrolactone=90/10 mass %. Its thermophysical properties, crystallization half-time, logarithmic viscosity, and IR spectrum did not largely differ from those of the polyimide powder 1. According to the method of JIS K0069, when the polyimide powder 3 was sifted through a sieve with a mesh opening of 500 μm, 99 mass % or more of particles passed through the sieve. When the polyimide powder 3 was sifted through a sieve with a mesh opening of 250 μm, 99 mass % or more of particles passed through the sieve.

Example 4

360 g of polyimide powder 4 was obtained by synthesis and workup in the same way as in Example 1 except that the polymerization solvent (2-(2-methoxyethoxy)ethanol) of Example 1 was changed to a mixed solvent of 2-(2-methoxyethoxy)ethanol/γ-butyrolactone=70/30 mass %. Its thermophysical properties, crystallization half-time, logarithmic viscosity, and IR spectrum did not largely differ from those of the polyimide powder 1. According to the method of JIS K0069, when the polyimide powder 4 was sifted through a sieve with a mesh opening of 500 μm, 99 mass % or more of particles passed through the sieve. When the polyimide powder 4 was sifted through a sieve with a mesh opening of 250 μm, 99 mass % or more of particles passed through the sieve.

Example 5

352 g of polyimide powder 5 was obtained by synthesis and workup in the same way as in Example 1 except that the polymerization solvent (2-(2-methoxyethoxy)ethanol) of Example 1 was changed to 1,3-propanediol. Its thermophysical properties, crystallization half-time, logarithmic viscosity, and IR spectrum did not largely differ from those of the polyimide powder 1. According to the method of JIS K0069, when the polyimide powder 5 was sifted through a sieve with a mesh opening of 500 μm, 99 mass % or more of particles passed through the sieve. When the polyimide powder 5 was sifted through a sieve with a mesh opening of 250 μm, 99 mass % or more of particles passed through the sieve.

Example 6

348 g of polyimide powder 6 was obtained by synthesis and workup in the same way as in Example 1 except that the polymerization solvent (2-(2-methoxyethoxy)ethanol) of Example 1 was changed to 2-[2-(2-methoxyethoxy)ethoxy]ethanol (manufactured by Kanto Chemical Co., Inc.). Its thermophysical properties, crystallization half-time, logarithmic viscosity, and IR spectrum did not largely differ from those of the polyimide powder 1. According to the method of JIS K0069, when the polyimide powder 6 was sifted through a sieve with a mesh opening of 500 μm, 99 mass % or more of particles passed through the sieve. When the polyimide powder 6 was sifted through a sieve with a mesh opening of 250 μm, 95 mass % of particles passed through the sieve.

Comparative Example 1

Synthesis was carried out in the same way as in Example 1 except that the polymerization solvent (2-(2-methoxyethoxy)ethanol) of Example 1 was changed to γ-butyrolactone (manufactured by Mitsubishi Chemical Corp.). Because strong adhesion to the bottom of the container occurred in the middle of heating to 190° C., a large majority of the reaction products were not recoverable. Partially recovered slurry was filtered and dried to recover 64 g of polyimide, which however contained a large amount of polyimide clumps.

Comparative Example 2

Synthesis was carried out in the same way as in Example 1 except that the polymerization solvent (2-(2-methoxyethoxy)ethanol) of Example 1 was changed to dipropylene glycol monopropyl ether (manufactured by Wako Pure Chemical Industries, Ltd.). At the completion of the dropwise addition of the diamine, an inhomogeneous suspension was present in the container, and the formation of a polyamic acid solution was not confirmed. Then, the suspension was heated to 190° C. and subjected to workup in the same way as in Example 1. The powder obtained by drying at 190° C. was strongly discolored brown. After measuring the IR spectrum, the absorption of imide group-derived ν (C=O) was rarely seen, confirming that the imidization did not proceed.

The structural formula of the dipropylene glycol monopropyl ether is as described below.

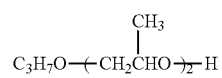

Comparative Example 3

Synthesis was carried out in the same way as in Example 1 except that the polymerization solvent (2-(2-methoxyethoxy)ethanol) of Example 1 was changed to diethylene glycol diethyl ether (manufactured by Wako Pure Chemical Industries, Ltd.). At the completion of the dropwise addition of the diamine, an inhomogeneous suspension was present in the container, and the formation of a polyamic acid solution was not confirmed. Then, the suspension was heated to 190° C. and subjected to workup in the same way as in Example 1. The powder obtained by drying at 190° C. was strongly discolored brown. After measuring the IR spectrum, the absorption of ν (C=O) was rarely seen, confirming that the imidization did not proceed.

Comparative Example 4

Synthesis and workup were carried out in the same way as in Example 1 except that the polymerization solvent (2-(2-methoxyethoxy)ethanol) of Example 1 was changed to N-methyl-2-pyrrolidone (manufactured by Mitsubishi Chemical Corp.). Because strong adhesion to the bottom of the container occurred in the middle of heating to 190° C., a large majority of the reaction products were not recoverable. Partially recovered slurry was filtered and dried to recover 92 g of polyimide, which however contained a large amount of polyimide clumps.

Comparative Example 5

650 g of N-methyl-2-pyrrolidone (manufactured by Mitsubishi Chemical Corp.) and 300.0 g (1.180 mol) of pyromellitic acid (manufactured by Mitsubishi Gas Chemical Co., Inc.) were introduced into a 2 L autoclave equipped with a thermocouple and a four-paddle blade. After creation of a nitrogen flow, the mixture was stirred at 150 rpm so as to become a homogeneous suspended solution. On the other hand, 83.96 g (0.5902 mol) of 1,3-bis(aminomethyl)cyclohexane (manufactured by Mitsubishi Gas Chemical Co., Inc.), 54.86 g (0.4722 mol) of 1,6-hexamethylenediamine (manufactured by Wako Pure Chemical Industries, Ltd.), and 23.64 g (0.1180 mol) of 4,4'-diaminodiphenyl ether (manufactured by Wakayama Seika Kogyo Co., Ltd.) were dissolved in 250 g of a mixed solvent of 2-(2-methoxyethoxy)ethanol/water=80/20 mass % using a 500-mL beaker to prepare a mixed diamine solution. This mixed diamine solution was added dropwise over 60 min to the suspended solution in the 2 L autoclave using a plunger pump. This dropwise addition was carried out in a nitrogen flow state over the whole period. The number of rotations of the stirring blade was set to 250 rpm. Because the strong adhesion of the resin in the autoclave occurred after the reaction, the polyimide was not recoverable.

<Evaluation 2>

In Examples 7 to 12 and Comparative Example 6, the basic evaluation of polyimide resin powder production was conducted by the methods shown in Evaluation 1, while the effect of suppressing the generation of by-products in polyimide resin powder production was evaluated by a method given below. This evaluation of the effect of suppressing the generation of by-products was also conducted in Example 1. The conditions and results of Evaluation 2 are shown in Tables 1 and 2.

7) Evaluation of Effect of Suppressing Generation of by-Products

The effect of suppressing the generation of by-products was evaluated by the GPC measurement of each obtained polyimide resin powder.

The GPC measurement was carried out using Shodex GPC-101 manufactured by Showa Denko K.K. The measurement conditions are as follows:
  Column: Shodex HFIP-806M
  Mobile phase solvent: HFIP containing 2 mM sodium trifluoroacetate
  Column temperature: 40° C.
  Mobile phase flow rate: 1.0 mL/min
  Sample concentration: approximately 0.1 mass %
  Detector: IR detector
  Injection volume: 100 μm
  Calibration curve: standard PMMA Example 1

The polyimide powder 1 obtained by the method already mentioned above was further subjected to molecular weight measurement by HFIP-GPC. As a result, two peaks were observed in a high-molecular-weight region and a low-molecular-weight region, respectively. The peak in the high-molecular-weight region corresponded to Mw of 31700, Mw/Mn of 2.3, and a peak area ratio of 99.7%, and the peak in the low-molecular-weight region corresponded to Mw of 410, a peak area ratio of 0.3%, and a peak top molecular weight of 510. The GPC chart of the polyimide powder 1 is shown in FIG. 1. In FIG. 1, the final rise in the baseline is ascribable to apparatus specifications.

Example 7

650 g of 2-(2-methoxyethoxy)ethanol (manufactured by Nippon Nyukazai Co., Ltd.) and 257.75 g (1.180 mol) of pyromellitic dianhydride (manufactured by Mitsubishi Gas Chemical Co., Inc.) were introduced into a 2 L autoclave equipped with a thermocouple and a four-paddle blade. After creation of a nitrogen flow, the mixture was stirred at 150 rpm so as to become a homogeneous suspended solution. On the other hand, 83.96 g (0.5902 mol) of 1,3-bis(aminomethyl)cyclohexane (manufactured by Mitsubishi Gas Chemical Co., Inc.), 54.86 g (0.4722 mol) of 1,6-hexamethylenediamine (manufactured by Wako Pure Chemical Industries, Ltd.), and 23.64 g (0.1180 mol) of 4,4'-diaminodiphenyl ether (manufactured by Wakayama Seika Kogyo Co., Ltd.) were dissolved in 250 g of 2-(2-methoxyethoxy)ethanol using a 500-mL beaker to prepare a mixed diamine solution. This mixed diamine solution was added dropwise over 60 min to the suspended solution in the 2 L autoclave using a plunger pump. This dropwise addition was carried out in a nitrogen flow state over the whole period. The number of rotations of the stirring blade was set to 250 rpm. The peak exothermic temperature during the dropwise addition was 65° C. After the completion of the dropwise addition, 100 g of 2-(2-methoxyethoxy)ethanol and 1.897 g (0.0177 mol) of benzylamine (manufactured by Kanto Chemical Co., Inc.) were added thereto, and the mixture was further stirred for 10 minutes. At this stage, a yellow clear homogenous polyamic acid solution was obtained. Next, the autoclave was hermetically sealed, and the stirring speed was set to 100 rpm. Then, the polyamic acid solution in the 2 L autoclave was heated to 190° C. When imidization occurs with heating, water is supposed to be generated. This water was wholly enclosed in the system. During the heating, the internal pressure was elevated to 0.3 MPaG. The solution was kept at 190° C. for 30 minutes. Then, 225 g of water was introduced into the 2 L autoclave using a plunger pump, and the mixture was allowed to cool to room temperature, and filtered. The obtained polyimide powder was washed with 300 g of 2-(2-methoxyethoxy)ethanol and 300 g of methanol (manufactured by Mitsubishi Gas Chemical Co., Inc.), filtered, and then dried at 190° C. for 10 hours in a drier to obtain 362 g of polyimide powder 7. As a result of DSC measurement, only $Tm_0$ was observed at 338° C. in the first temperature increase, whereas neither $Tg_0$ nor $Tc_0$ was distinctly observed (which means that the polyimide powder had a high degree of crystallinity). At the time of cooling, Tc was observed at 308° C. (amount of heat generation: 12.1 mJ/mg), confirming that the polyimide powder had high crystallinity. Tg and Tm were observed at 226° C. and 335° C., respectively, in the second temperature increase. The crystallization half-time was measured and consequently determined as 20 seconds or shorter. The 1% decomposition temperature was 410° C., and the logarithmic viscosity was 0.61 dL/g. As a result of measuring the IR spectrum, the characteristic absorption of the imide ring was observed at ν (C=O) 1771, 1699 ($cm^{-1}$). According to the method of JIS K0069, when the polyimide powder 7 was sifted through a sieve with a mesh opening of 500 μm, 99% or more of particles passed through the sieve. The polyimide powder 7 was further subjected to molecular weight measurement by HFIP-GPC. As a result, two peaks were observed in a high-molecular-weight region and a low-molecular-weight region, respectively. The peak in the high-molecular-weight region corresponded to Mw of 28000, Mw/Mn of 2.2, and a peak area ratio of 99.5%, and the peak in the low-molecular-weight region corresponded to Mw of 430, a peak area ratio of 0.5%, and a peak top molecular weight of 480.

Example 8

365 g of polyimide powder 8 was obtained by synthesis and workup in the same way as in Example 1 except that the dropwise addition time of the mixed diamine solution was changed to 15 min (the peak exothermic temperature during the dropwise addition was 83° C.). Its thermophysical properties, crystallization half-time, logarithmic viscosity, IR spectrum, and particle size did not largely differ from those of the polyimide powder 1. The polyimide powder 8 was subjected to molecular weight measurement by HFIP-GPC. As a result, two peaks were observed in a high-molecular-weight region and a low-molecular-weight region, respectively. The peak in the high-molecular-weight region corresponded to Mw of 32500, Mw/Mn of 2.5, and a peak area ratio of 99.2%, and the peak in the low-molecular-weight region corresponded to Mw of 370, a peak area ratio of 0.8%, and a peak top molecular weight of 450.

Example 9

360 g of polyimide powder 9 was obtained by synthesis and workup in the same way as in Example 1 except that the dropwise addition time of the mixed diamine solution was changed to 90 min (the peak exothermic temperature during the dropwise addition was 59° C.). Its thermophysical properties, crystallization half-time, logarithmic viscosity, IR spectrum, and particle size did not largely differ from those of the polyimide powder 1. The polyimide powder 9 was subjected to molecular weight measurement by HFIP-GPC. As a result, two peaks were observed in a high-molecular-weight region and a low-molecular-weight region, respectively. The peak in the high-molecular-weight region corresponded to Mw of 34400, Mw/Mn of 2.3, and a peak area ratio of 98.9%, and the peak in the low-molecular-weight region corresponded to Mw of 370, a peak area ratio of 1.1%, and a peak top molecular weight of 450.

Example 10

362 g of polyimide powder 10 was obtained by synthesis and workup in the same way as in Example 1 except that the dropwise addition time of the mixed diamine solution was changed to 180 min (the peak exothermic temperature during the dropwise addition was 54° C.). Its thermophysical properties, crystallization half-time, logarithmic viscosity, IR spectrum, and particle size did not largely differ from those of the polyimide powder 1. The polyimide powder 10 was subjected to molecular weight measurement by HFIP-GPC. As a result, two peaks were observed in a high-molecular-weight region and a low-molecular-weight region, respectively. The peak in the high-molecular-weight region corresponded to Mw of 32400, Mw/Mn of 2.3, and a peak area ratio of 99.1%, and the peak in the low-molecular-weight region corresponded to Mw of 360, a peak area ratio of 0.9%, and a peak top molecular weight of 440.

Example 11

359 g of polyimide powder 11 was obtained by synthesis (the peak exothermic temperature during the dropwise addition was 67° C.) and workup in the same way as in Example 1 except that the polymerization solvent (2-(2-methoxyethoxy)ethanol) of Example 1 was changed to 2-[2-(2-methoxyethoxy)ethoxy]ethanol (manufactured by Kanto Chemical Co., Inc.). Its thermophysical properties, crystallization half-time, IR spectrum, and particle size did not largely differ from those of the polyimide powder 1. The polyimide powder 11 was subjected to molecular weight measurement by HFIP-GPC. As a result, two peaks were observed in a high-molecular-weight region and a low-molecular-weight region, respectively. The peak in the high-molecular-weight region corresponded to Mw of 64300, Mw/Mn of 3.0, and a peak area ratio of 99.5%, and the peak in the low-molecular-weight region corresponded to Mw of 380, a peak area ratio of 0.5%, and a peak top molecular weight of 500.

Example 12

Figure 2:
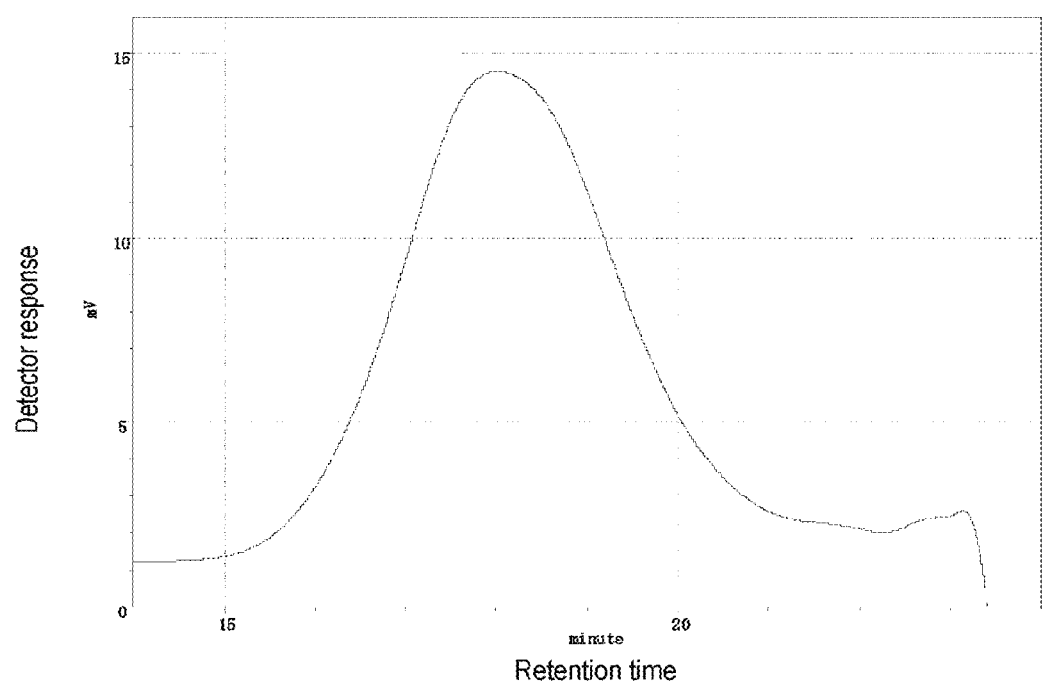
FIG. 2 is a GPC chart of a product obtained in Example 12.

650 g of 2-(2-methoxyethoxy)ethanol (manufactured by Nippon Nyukazai Co., Ltd.) and 257.75 g (1.180 mol) of pyromellitic dianhydride (manufactured by Mitsubishi Gas Chemical Co., Inc.) were introduced into a 2 L separable flask equipped with a Dean-Stark apparatus, a Liebig condenser tube, a thermocouple, and a four-paddle blade. After creation of a nitrogen flow, the mixture was stirred at 150 rpm so as to become a homogeneous suspended solution. On the other hand, 83.96 g (0.5902 mol) of 1,3-bis(aminomethyl)cyclohexane (manufactured by Mitsubishi Gas Chemical Co., Inc.), 54.86 g (0.4722 mol) of 1,6-hexamethylenediamine (manufactured by Wako Pure Chemical Industries, Ltd.), and 23.64 g (0.1180 mol) of 4,4'-diaminodiphenyl ether (manufactured by Wakayama Seika Kogyo Co., Ltd.) were dissolved in 250 g of 2-(2-methoxyethoxy)ethanol using a 500-mL beaker to prepare a mixed diamine solution. This mixed diamine solution was added dropwise over 5 min to the suspended solution in the 2 L separable flask using a dropping funnel. In this operation, strong deposition that seemed to be a polyamic acid salt occurred, resulting in poor stirring. The number of rotations of stirring was therefore decreased to 20 rpm, and the stirring was carried out for 10 minutes. The deposits were gradually dispersed to permit stirring. Thus, the number of rotations of stirring was brought back to 250 rpm. This dropwise addition was carried out in a nitrogen flow state over the whole period. The peak exothermic temperature during the dropwise addition was 98° C. After the completion of the dropwise addition, 100 g of 2-(2-methoxyethoxy)ethanol and 1.897 g (0.0177 mol) of benzylamine (manufactured by Kanto Chemical Co., Inc.) were added thereto, and the mixture was further stirred for 10 minutes. At this stage, a light brown polyamic acid solution also containing the deposits was obtained. The subsequent procedures (imidization by heating, washing, and drying) were carried out in the same way as in Example 1 to obtain 355 g of polyimide powder 12. Its thermophysical properties, crystallization half-time, logarithmic viscosity, IR spectrum, and particle size did not largely differ from those of the polyimide powder 1. The polyimide powder 12 was subjected to molecular weight measurement by HFIP-GPC. As a result, two peaks were observed in a high-molecular-weight region and a low-molecular-weight region, respectively. The peak in the high-molecular-weight region corresponded to Mw of 30800, Mw/Mn of 2.4, and a peak area ratio of 97.5%, and the peak in the low-molecular-weight region corresponded to Mw of 400, a peak area ratio of 2.5%, and a peak top molecular weight of 380. The GPC chart of the polyimide powder 12 is shown in FIG. 2. In FIG. 2, the final drop in the baseline is probably ascribable to fluctuations in the concentration of the stabilizer sodium trifluoroacetate.

Comparative Example 6

650 g of 2-(2-methoxyethoxy)ethanol (manufactured by Nippon Nyukazai Co., Ltd.) and 300.0 g (1.180 mol) of pyromellitic acid (manufactured by Mitsubishi Gas Chemical Co., Inc.) were introduced into a 2 L separable flask equipped with a Dean-Stark apparatus, a Liebig condenser tube, a thermocouple, and a four-paddle blade. After creation of a nitrogen flow, the mixture was stirred at 150 rpm so as to become a homogeneous suspended solution. On the other hand, 83.96 g (0.5902 mol) of 1,3-bis(aminomethyl)cyclohexane (manufactured by Mitsubishi Gas Chemical Co., Inc.), 54.86 g (0.4722 mol) of 1,6-hexamethylenediamine (manufactured by Wako Pure Chemical Industries, Ltd.), and 23.64 g (0.1180 mol) of 4,4'-diaminodiphenyl ether (manufactured by Wakayama Seika Kogyo Co., Ltd.) were dissolved in 250 g of 2-(2-methoxyethoxy)ethanol using a 500-mL beaker to prepare a mixed diamine solution. This mixed diamine solution was added dropwise over 60 min to the suspended solution in the 2 L separable flask using a plunger pump. This dropwise addition was carried out in a nitrogen flow state over the whole period. The number of rotations of the stirring blade was set to 250 rpm. A strong salt was gradually deposited by the dropwise addition, resulting in poor stirring at the point in time when about half the amount of the diamine was introduced. The salt was not dispersed even at the time of heating. Thus, homogeneous slurry was not obtained, and the continuation of the reaction was difficult.

TABLE 1

|  |  | Example 1 | Example 7 | Example 8 | Example 9 |
|---|---|---|---|---|---|
| Tetracarboxylic acid component |  | PMDA | | | |
| Addition time of diamine component (min) |  | 60 | 15 | | 90 |
| Addition rate of diamine component* (mol/min) |  |  | 0.017 | 0.067 | 0.011 |
| Polymerization solvent |  | MDG | | | |
| High-molecular-weight region | Mw | 31700 | 28000 | 32500 | 34400 |
|  | area % | 99.7 | 99.5 | 99.2 | 98.9 |
| Low-molecular-weight region | Mw | 410 | 430 | 370 | 370 |
|  | area % | 0.3 | 0.5 | 0.8 | 1.1 |

*Addition rate of diamine component = Amount of the diamine component added per unit time with respect to 1 mol of the tetracarboxylic acid component

TABLE 2

|  |  | Example 10 | Example 11 | Example 12 | Comparative Example 6 |
|---|---|---|---|---|---|
| Tetracarboxylic acid component |  | PMDA | | | PMA |
| Addition time of diamine component (min) |  | 180 | 60 | 5 | 60 |
| Addition rate of diamine component* (mol/min) |  | 0.0056 | 0.017 | 0.2 | 0.017 |
| Polymerization solvent |  | MDG | MTG | MDG | |
| High-molecular-weight region | Mw | 32400 | 64300 | 30800 | Impossible synthesis |
|  | area % | 99.1 | 99.5 | 97.5 | |
| Low-molecular-weight region | Mw | 360 | 380 | 400 | |
|  | area % | 0.9 | 0.5 | 2.5 | |

*Addition rate of diamine component = Amount of the diamine component added per unit time with respect to 1 mol of the tetracarboxylic acid component In these tables, the abbreviations are as defined below.
PMDA: pyromellitic dianhydride
PMA: pyromellitic acid
MDG: 2-(2-methoxyethoxy)ethanol
MTG: 2-[2(2-methoxyethoxy)ethoxy]ethanol
<Evaluation 3>
In Examples 13 to 17, the basic evaluation of polyimide resin powder production was conducted by the methods shown in Evaluation 1, while the particle size distribution of each polyimide resin powder was evaluated by methods given below. This evaluation of the particle size distribution of the polyimide resin powder was also conducted in Example 1.
8) Laser Diffraction-Type Particle Size Distribution Measurement
In the laser diffraction-type particle size distribution measurement, LMS-2000e manufactured by Seishin Enterprise Co., Ltd. was used. The measurement was carried out under conditions where the powder to be measured was sufficiently dispersed under ultrasonic conditions by using water as a dispersion medium. The measurement range was set to 0.02 to 2000 μm.
9) Imaging-Type Particle Size Distribution Measurement
In the imaging-type particle size distribution measurement, FPIA-3000 manufactured by Malvern Instruments Ltd. was used. In the imaging-type particle size measurement, particles were directly measured using a camera, and the circularity was determined according to the expression given below. The circularity was an index that was measured from 0 to 1.000 with 1.000 defined as a true circle.

Circularity=Perimeter of a true circle having the same area as that of the imaged particle/Perimeter of the imaged particle The measurement was carried out under conditions where the powder to be measured was sufficiently dispersed under ultrasonic conditions by using a 0.2 wt % aqueous sodium hexametaphosphate solution as a dispersion medium and adding 10 drops of a 10 wt % aqueous triton X-100 solution as a surfactant. The measurement range was set to 0.5 to 200 μm.

Example 1

Figure 3:
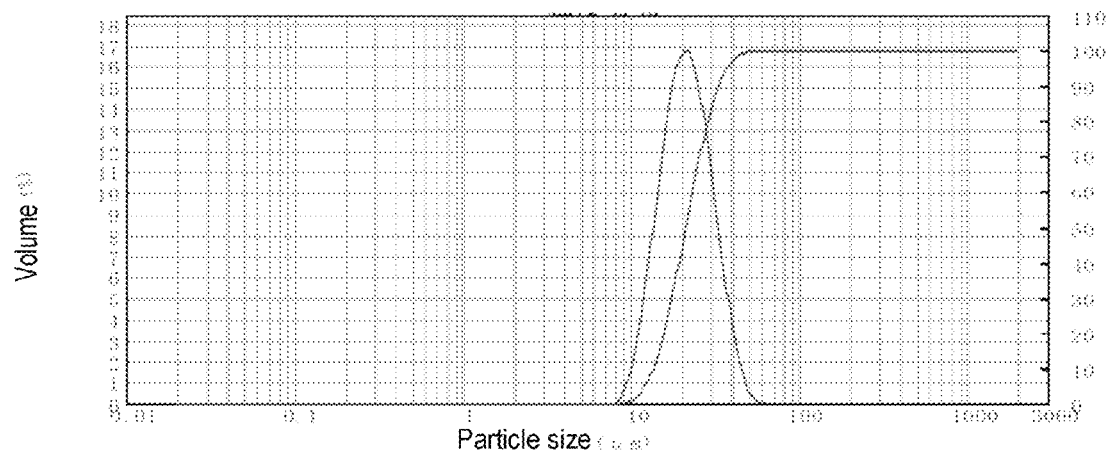
FIG. 3 shows measurement results of laser diffraction-type particle size distribution measurement of the product obtained in Example 1.
Figure 4:
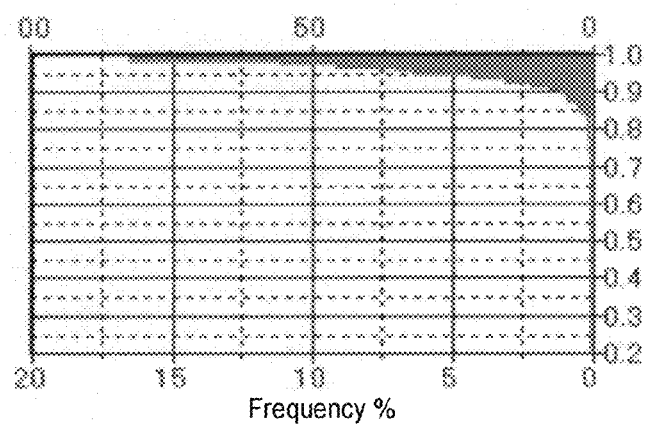
FIG. 4 shows measurement results of imaging-type particle size distribution measurement of the product obtained in Example 1.

The polyimide powder 1 obtained by the method already mentioned above was subjected to particle size measurement using the laser diffraction light scattering-type particle size distribution measurement apparatus. As a result, the polyimide powder 1 had D10 of 13.6 μm, D50 of 21.2 μm, and D90 of 33.3 μm, confirming that the particle size distribution was unimodal and narrow. FIG. 3 shows the measurement results of the laser diffraction-type particle size distribution measurement. The average circularity determined by the imaging-type particle size distribution measurement was 0.969, and this value was close to the true circle. FIG. 4 shows the measurement results of the imaging-type particle size distribution measurement.

Example 13

Figure 5:
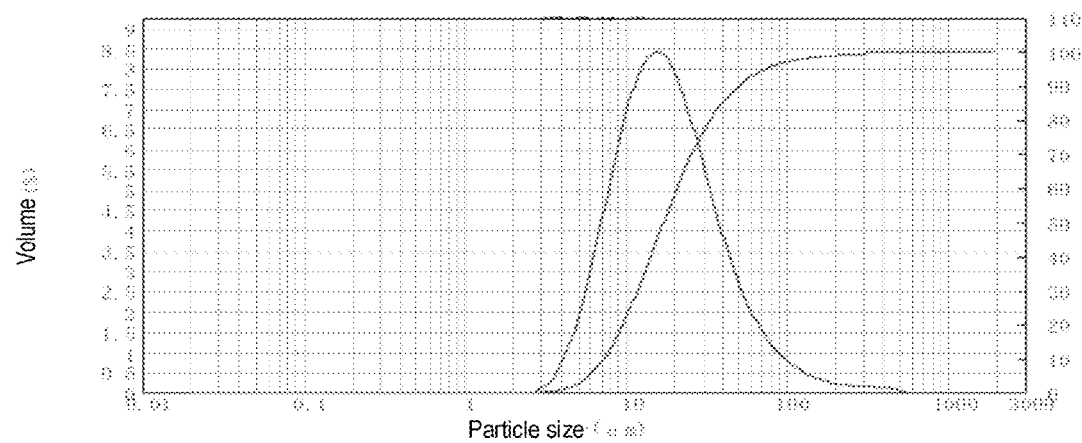
FIG. 5 shows measurement results of laser diffraction-type particle size distribution measurement of a product obtained in Example 13.

355 g of polyimide powder 13 was obtained by synthesis and workup in the same way as in Example 1 except that the polymerization solvent (2-(2-methoxyethoxy)ethanol) of Example 1 was changed to a mixed solvent of 2-(2-methoxyethoxy)ethanol/γ-butyrolactone (manufactured by Mitsubishi Chemical Corp.)=70/30 mass %. Its thermophysical properties, crystallization half-time, logarithmic viscosity, and IR spectrum did not largely differ from those of the polyimide powder 1. According to the method of JIS K0069, when the polyimide powder 13 was sifted through a sieve with a mesh opening of 500 μm, 99 mass % or more of particles passed through the sieve. When the polyimide powder 13 was sifted through a sieve with a mesh opening of 250 μm, 99 mass % or more of particles passed through the sieve. The polyimide powder 13 was subjected to particle size measurement using the laser diffraction light scattering-type particle size distribution measurement apparatus. As a result, the polyimide powder 13 had D10 of 7.36 μm, D50 of 17.3 μm, and D90 of 50.3 μm, confirming that the particle size distribution was unimodal and narrow. FIG. 5 shows the measurement results of the laser diffraction-type particle size distribution measurement. The average circularity determined by the imaging-type particle size distribution measurement was 0.936, and this value was close to the true circle.

Example 14

Figure 6:
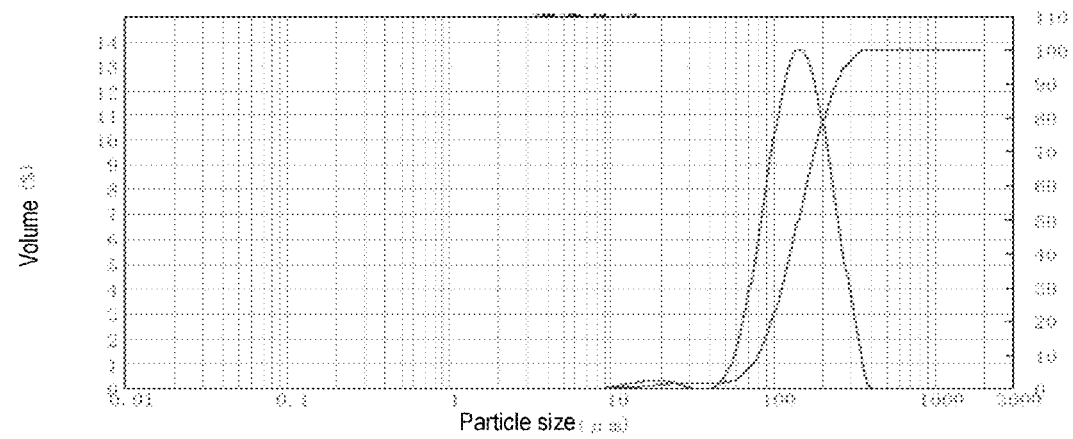
FIG. 6 shows measurement results of laser diffraction-type particle size distribution measurement of a product obtained in Example 14.

359 g of polyimide powder 14 was obtained by synthesis and workup in the same way as in Example 1 except that the polymerization solvent (2-(2-methoxyethoxy)ethanol) of Example 1 was changed to 2-[2-(2-methoxyethoxy)ethoxy]ethanol (manufactured by Kanto Chemical Co., Inc.). Its thermophysical properties, crystallization half-time, logarithmic viscosity, and IR spectrum did not largely differ from those of the polyimide powder 1. According to the method of JIS K0069, when the polyimide powder 14 was sifted through a sieve with a mesh opening of 500 µm, 99 mass % or more of particles passed through the sieve. When the polyimide powder 14 was sifted through a sieve with a mesh opening of 250 µm, 95 mass % of particles passed through the sieve. The polyimide powder 14 was subjected to particle size measurement using the laser diffraction light scattering-type particle size distribution measurement apparatus. As a result, the polyimide powder 14 had D10 of 81.3 µm, D50 of 144.0 µm, and D90 of 247 µm, confirming that the particle size distribution was unimodal and narrow. FIG. 6 shows the measurement results of the laser diffraction-type particle size distribution measurement. The imaging-type particle size distribution measurement was impossible due to the presence of particles that fell without the measurement range.

Example 15

Figure 7:
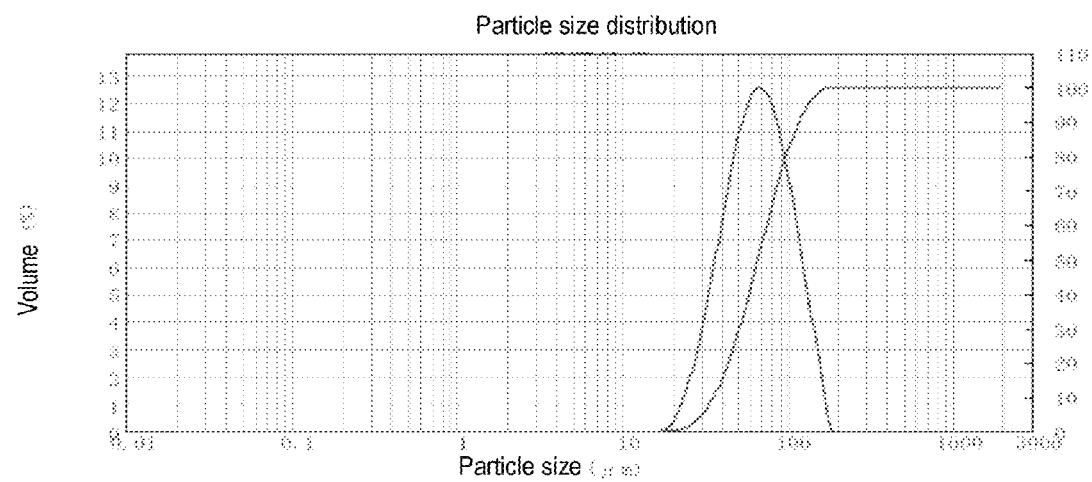
FIG. 7 shows measurement results of laser diffraction-type particle size distribution measurement of a product obtained in Example 15.

650 g of 2-(2-methoxyethoxy)ethanol (manufactured by Nippon Nyukazai Co., Ltd.) and 257.75 g (1.180 mol) of pyromellitic dianhydride (manufactured by Mitsubishi Gas Chemical Co., Inc.) were introduced into a 2 L autoclave equipped with a thermocouple and a four-paddle blade. After creation of a nitrogen flow, the mixture was stirred at 150 rpm so as to become a homogeneous suspended solution. On the other hand, 83.96 g (0.5902 mol) of 1,3-bis(aminomethyl)cyclohexane (manufactured by Mitsubishi Gas Chemical Co., Inc.), 54.86 g (0.4722 mol) of 1,6-hexamethylenediamine (manufactured by Wako Pure Chemical Industries, Ltd.), and 23.64 g (0.1180 mol) of 4,4'-diaminodiphenyl ether (manufactured by Wakayama Seika Kogyo Co., Ltd.) were dissolved in 250 g of 2-(2-methoxyethoxy)ethanol using a 500-ml beaker to prepare a mixed diamine solution. This mixed diamine solution was added dropwise over 60 min to the suspended solution in the 2 L autoclave using a plunger pump. This dropwise addition was carried out in a nitrogen flow state over the whole period. The number of rotations of the stirring blade was set to 250 rpm. After the completion of the dropwise addition, 1.897 g (0.0177 mol) of benzylamine (manufactured by Kanto Chemical Co., Inc.) was added thereto, and the mixture was further stirred for 10 minutes. At this stage, a yellow clear homogenous polyamic acid solution was obtained. Next, the autoclave was hermetically sealed, and the stirring speed was set to 100 rpm. Then, the polyamic acid solution in the 2 L autoclave was heated to 190° C. During the heating, the internal pressure was elevated to 0.3 MPaG clue to the influence of water generated in association with imidization. The solution was kept at 190° C. for 30 minutes, then allowed to cool to room temperature, and filtered. The obtained polyimide powder was washed with 300 g of 2-(2-methoxyethoxy)ethanol and 300 g of methanol (manufactured by Mitsubishi Gas Chemical Co., Inc.), filtered, and then dried at 190° C. for 10 hours in a drier to obtain 366 g of polyimide powder 15. As a result of DSC measurement, only $Tm_0$ was observed at 338° C. in the first temperature increase, whereas neither $Tg_0$ nor $Tc_0$ was distinctly observed (which means that the polyimide powder had a high degree of crystallinity). At the time of cooling, Tc was observed at 308° C. (amount of heat generation: 12.1 mJ/mg), confirming that the polyimide powder had high crystallinity. Tg and Tm were observed at 226° C. and 335° C., respectively, in the second temperature increase. The crystallization half-time was measured and consequently determined as 20 seconds or shorter. The 1% decomposition temperature was 410° C., and the logarithmic viscosity was 0.61 dL/g. As a result of measuring the IR spectrum, the characteristic absorption of the imide ring was observed at ν (C=O) 1771, 1699 (cm$^{-1}$). According to the method of JIS K0069, when the polyimide powder 15 was sifted through a sieve with a mesh opening of 500 µm, 99 mass % or more of particles passed through the sieve. When the polyimide powder 15 was sifted through a sieve with a mesh opening of 250 µm, 99 mass % or more of particles passed through the sieve. The polyimide powder 15 was subjected to particle size measurement using the laser diffraction light scattering-type particle size distribution measurement apparatus. As a result, the polyimide powder 15 had D10 of 36.0 µm, D50 of 66.4 µm, and D90 of 117.7 µm, confirming that the particle size distribution was unimodal and narrow. FIG. 7 shows the measurement results of the laser diffraction-type particle size distribution measurement. The average circularity determined by the imaging-type particle size distribution measurement was 0.884.

<Evaluation 4>

In Examples 16 to 18, evaluation was conducted by the methods shown in 1) to 6) of Evaluation 1, 7) of Evaluation 2, and 8) of Evaluation 3.

Example 16

650 g of 2-(2-methoxyethoxy)ethanol (manufactured by Nippon Nyukazai Co., Ltd.) and 163.59 g (0.750 mol) of pyromellitic dianhydride (manufactured by Mitsubishi Gas Chemical Co., Inc.) were introduced into a 2 L separable flask equipped with a Dean-Stark apparatus, a Liebig condenser tube, a thermocouple, and a four-paddle blade. After creation of a nitrogen flow, the mixture was stirred at 150 rpm so as to become a homogeneous suspended solution. On the other hand, 42.36 g (0.2978 mol) of 1,3-bis(aminomethyl)cyclohexane (manufactured by Mitsubishi Gas Chemical Co., Inc.) and 64.43 g (0.4467 mol) of 1,8-octamethylenediamine (manufactured by Tokyo Chemical Industry Co., Ltd.) were dissolved in 250 g of 2-(2-methoxyethoxy)ethanol using a 500-mL beaker to prepare a mixed diamine solution.

This mixed diamine solution was added dropwise over 60 min to the suspended solution in the 2 L separable flask using a plunger pump. This dropwise addition of the mixed diamine solution was carried out in a nitrogen flow state over the whole period. The number of rotations of the stirring blade was set to 250 rpm. After the completion of the dropwise addition, 100 g of 2-(2-methoxyethoxy)ethanol and 1.19 g (0.0112 mol) of benzylamine (manufactured by Kanto Chemical Co., Inc.) were added thereto, and the mixture was further stirred. At this stage, a yellow clear homogenous polyamic acid solution was obtained. Next, the stirring speed was set to 200 rpm, and the polyamic acid solution in the 2 L separable flask was then heated to 190° C. In this heating process, the deposition of a polyimide powder and dehydration associated with imidization were confirmed at a solution temperature from 130 to 150° C. The solution was kept at 190° C. for 30 minutes, then allowed to cool to room temperature, and filtered. The obtained polyimide powder was washed with 300 g of 2-(2-methoxyethoxy)ethanol and 300 g of methanol, filtered, and then dried at 190° C. for 10 hours in a drier to obtain 235 g of white polyimide powder 16.

As a result of DSC measurement, only $Tm_0$ was observed at 298° C. in the first temperature increase, whereas neither $Tg_0$ nor $Tc_0$ was distinctly observed (which means that the polyimide powder had a high degree of crystallinity). At the time of cooling, Tc was observed at 247° C. and 253° C. (amount of heat generation: 16.4 mJ/mg), confirming that the polyimide powder had high crystallinity. Tg and Tm were observed at 201° C. and 307° C., respectively, in the second temperature increase.

The crystallization half-time was measured and consequently determined as 20 seconds or shorter. The logarithmic viscosity was 0.69 dL/g. As a result of measuring the IR spectrum, the characteristic absorption of the imide ring was observed at $\nu$ (C=O) 1771, 1699 (cm$^{-1}$). The 1% decomposition temperature was 376° C. According to the method of JIS K0069, when the polyimide powder 16 was sifted through a sieve with a mesh opening of 500 μm, 99 mass % or more of particles passed through the sieve. When the polyimide powder 16 was sifted through a sieve with a mesh opening of 250 μm, 99 mass % or more of particles passed through the sieve.

The polyimide powder 16 was subjected to molecular weight measurement by HFIP-GPC. As a result, a unimodal peak was observed with Mw of 36000 and Mw/Mn of 4.5.

Figure 8:
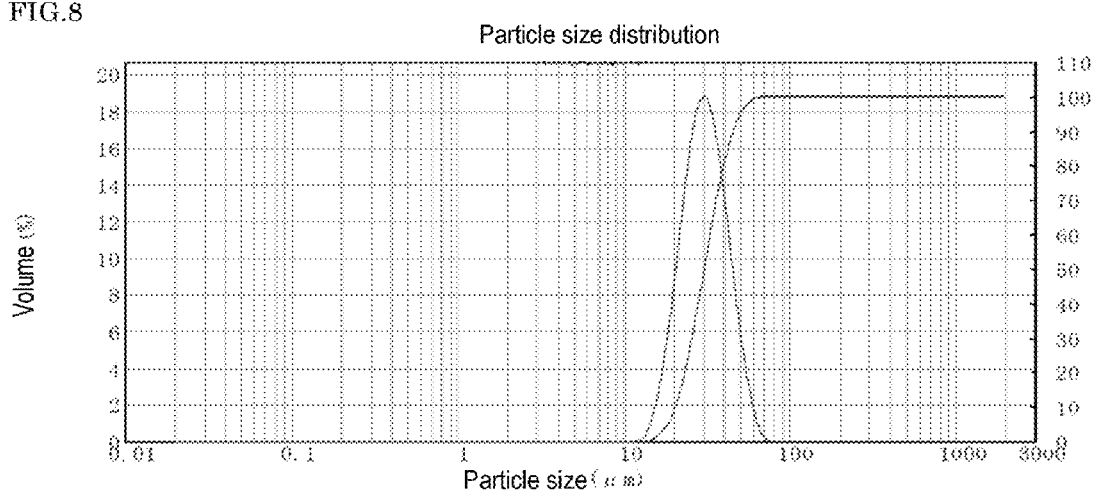
FIG. 8 shows measurement results of laser diffraction-type particle size distribution measurement of a product obtained in Example 16.

The polyimide powder 16 was subjected to particle size measurement using the laser diffraction light scattering-type particle size distribution measurement apparatus. As a result, the polyimide powder 16 had D10 of 20.44 μm, D50 of 30.53 μm, and D90 of 45.61 μm, confirming that the particle size distribution was unimodal and narrow. FIG. 8 shows the measurement results of the laser diffraction-type particle size distribution measurement.

Example 17

650 g of 2-(2-methoxyethoxy)ethanol (manufactured by Nippon Nyukazai Co., Ltd.) and 163.59 g (0.750 mol) of pyromellitic dianhydride (manufactured by Mitsubishi Gas Chemical Co., Inc.) were introduced into a 2 L separable flask equipped with a Dean-Stark apparatus, a Liebig condenser tube, a thermocouple, and a four-paddle blade. After creation of a nitrogen flow, the mixture was stirred at 150 rpm so as to become a homogeneous suspended solution. On the other hand, 42.36 g (0.2978 mol) of 1,3-bis(aminomethyl)cyclohexane (manufactured by Mitsubishi Gas Chemical Co., Inc.) and 76.967 g (0.4467 mol) of 1,10-decamethylenediamine (manufactured by Kokura Synthetic Industries, Ltd.) were dissolved in 250 g of 2-(2-methoxyethoxy)ethanol using a 500-mL beaker to prepare a mixed diamine solution. This mixed diamine solution was added dropwise over 60 min to the suspended solution in the 2 L separable flask using a plunger pump. This dropwise addition of the mixed diamine solution was carried out in a nitrogen flow state over the whole period. The number of rotations of the stirring blade was set to 250 rpm. After the completion of the dropwise addition, 100 g of 2-(2-methoxyethoxy)ethanol and 1.19 g (0.0112 mol) of benzylamine (manufactured by Kanto Chemical Co., Inc.) were added thereto, and the mixture was further stirred. At this stage, a yellow clear homogenous polyamic acid solution was obtained. Next, the stirring speed was set to 200 rpm, and the polyamic acid solution in the 2 L separable flask was then heated to 190° C. In this heating process, the deposition of a polyimide powder and dehydration associated with imidization were confirmed at a solution temperature from 130 to 150° C. The solution was kept at 190° C. for 30 minutes, then allowed to cool to room temperature, and filtered. The obtained polyimide powder was washed with 300 g of 2-(2-methoxyethoxy)ethanol and 300 g of methanol, filtered, and then dried at 190° C. for 10 hours in a drier to obtain 247 g of white polyimide powder 17.

As a result of DSC measurement, only $Tg_0$ and $Tm_0$ were observed at 184° C. and 272° C., respectively, in the first temperature increase, whereas $Tc_0$ was not distinctly observed (which means that the polyimide powder had a high degree of crystallinity). At the time of cooling, Tc was observed at 225° C. (amount of heat generation: 17.7 mJ/mg), confirming that the polyimide powder had high crystallinity. Tg was observed at 187° C. and Tm was observed at 267° C. and 277° C. in the second temperature increase. The crystallization half-time was measured and consequently determined as 20 seconds or shorter. The logarithmic viscosity was 0.71 dL/g. As a result of measuring the IR spectrum, the characteristic absorption of the imide ring was observed at $\nu$ (C=O) 1771, 1699 (cm$^{-1}$). The 1% decomposition temperature was 380° C. According to the method of JIS K0069, when the polyimide powder 17 was sifted through a sieve with a mesh opening of 500 μm, 99 mass % or more of particles passed through the sieve. When the polyimide powder 17 was sifted through a sieve with a mesh opening of 250 μm, 99 mass % or more of particles passed through the sieve.

The polyimide powder 17 was subjected to molecular weight measurement by HFIP-GPC. As a result, two peaks were observed in a high-molecular-weight region and a low-molecular-weight region, respectively. The peak in the high-molecular-weight region corresponded to Mw of 78000, Mw/Mn of 3.6, and a peak area ratio of 99.1%, and the peak in the low-molecular-weight region corresponded to Mw of 650, a peak area ratio of 0.9%, and a peak top molecular weight of 530.

Figure 9:
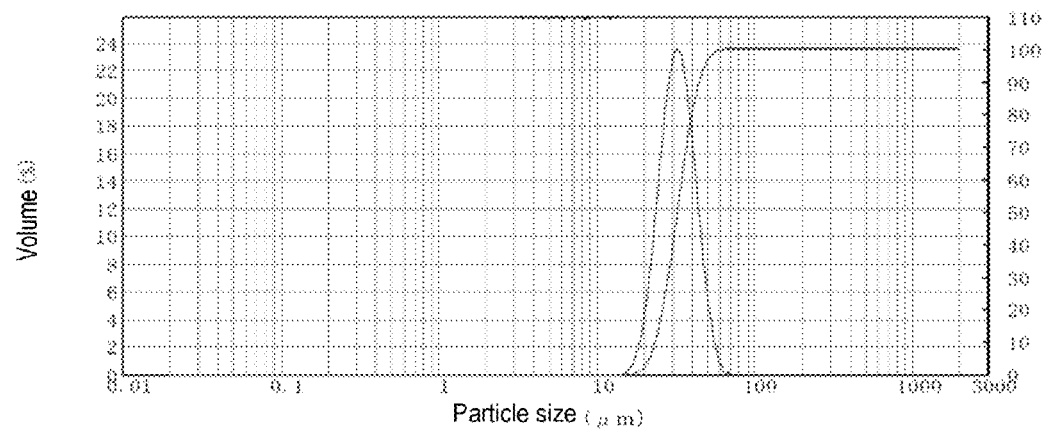
FIG. 9 shows measurement results of laser diffraction-type particle size distribution measurement of a product obtained in Example 17.

The polyimide powder 17 was subjected to particle size measurement using the laser diffraction light scattering-type particle size distribution measurement apparatus. As a result, the polyimide powder 17 had D10 of 23.54 μm, D50 of 32.51 μm, and D90 of 44.76 μm, confirming that the particle size distribution was unimodal and narrow. FIG. 9 shows the measurement results of the laser diffraction-type particle size distribution measurement.

Example 18

650 g of 2-(2-methoxyethoxy)ethanol (manufactured by Nippon Nyukazai Co., Ltd.) and 163.59 g (0.750 mol) of pyromellitic dianhydride (manufactured by Mitsubishi Gas Chemical Co., Inc.) were introduced into a 2 L separable flask equipped with a Dean-Stark apparatus, a Liebig condenser tube, a thermocouple, and a four-paddle blade. After creation of a nitrogen flow, the mixture was stirred at 150 rpm so as to become a homogeneous suspended solution. On the other hand, 42.36 g (0.2978 mol) of 1,3-bis(aminomethyl)cyclohexane (manufactured by Mitsubishi Gas Chemical Co., Inc.) and 89.50 g (0.4467 mol) of 1,12-dodecamethylenediamine (manufactured by Tokyo Chemical Industry Co., Ltd.) were dissolved in 250 g of 2-(2-methoxyethoxy)ethanol using a 500-mL beaker to prepare a mixed diamine solution.

This mixed diamine solution was added dropwise over 60 min to the suspended solution in the 2 L separable flask using a plunger pump. This dropwise addition of the mixed diamine solution was carried out in a nitrogen flow state over the whole period. The number of rotations of the stirring blade was set to 250 rpm. After the completion of the dropwise addition, 100 g of 2-(2-methoxyethoxy)ethanol and 1.19 g (0.0112 mol) of benzylamine (manufactured by Kanto Chemical Co., Inc.) were added thereto, and the mixture was further stirred. At this stage, a yellow clear homogenous polyamic acid solution was obtained. Next, the stirring speed was set to 200 rpm, and the polyamic acid solution in the 2 L separable flask was then heated to 190° C. In this heating process, the deposition of a polyimide powder and dehydration associated with imidization were confirmed at a solution temperature from 130 to 150° C. The solution was kept at 190° C. for 30 minutes, then allowed to cool to room temperature, and filtered. The obtained polyimide powder was washed with 300 g of 2-(2-methoxyethoxy)ethanol and 300 g of methanol, filtered, and then dried at 190° C. for 10 hours in a drier to obtain 260 g of white polyimide powder 18.

As a result of DSC measurement, only $Tm_0$ was observed at 249° C. in the first temperature increase, whereas neither $Tg_0$ nor $Tc_0$ was distinctly observed (which means that the polyimide powder had a high degree of crystallinity). At the time of cooling, Tc was observed at 212° C. (amount of heat generation: 22.8 mJ/mg), confirming that the polyimide powder had high crystallinity. Tg and Tm were observed at 173° C. and 253° C., respectively, in the second temperature increase. The crystallization half-time was measured and consequently determined as 20 seconds or shorter. The logarithmic viscosity was 0.73 dL/g. As a result of measuring the IR spectrum, the characteristic absorption of the imide ring was observed at ν (C=O) 1771, 1699 ($cm^{-1}$). The 1% decomposition temperature was 377° C. According to the method of JIS K0069, when the polyimide powder 18 was sifted through a sieve with a mesh opening of 500 μm, 99 mass % or more of particles passed through the sieve. When the polyimide powder 18 was sifted through a sieve with a mesh opening of 250 μm, 99 mass % or more of particles passed through the sieve.

The polyimide powder 18 was subjected to molecular weight measurement by HFIP-GPC. As a result, two peaks were observed in a high-molecular-weight region and a low-molecular-weight region, respectively. The peak in the high-molecular-weight region corresponded to Mw of 108300, Mw/Mn of 4.4, and a peak area ratio of 98.9%, and the peak in the low-molecular-weight region corresponded to Mw of 530, a peak area ratio of 1.1%, and a peak top molecular weight of 480.

Figure 10:
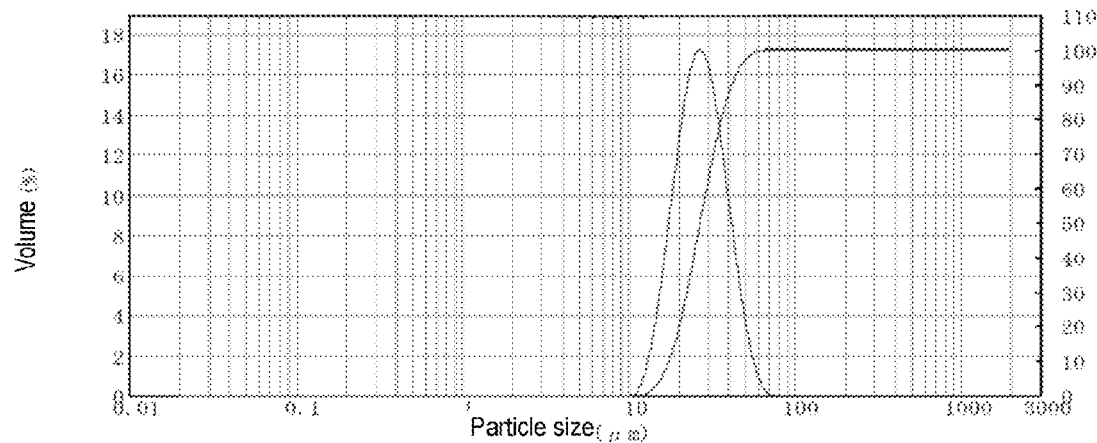
FIG. 10 shows measurement results of laser diffraction-type particle size distribution measurement of a product obtained in Example 18.

The polyimide powder 18 was subjected to particle size measurement using the laser diffraction light scattering-type particle size distribution measurement apparatus. As a result, the polyimide powder 18 had D10 of 17.54 μm, D50 of 27.01 μm, and D90 of 41.93 μm, confirming that the particle size distribution was unimodal and narrow. FIG. 10 shows the measurement results of the laser diffraction-type particle size distribution measurement.

Preferred embodiments of the invention are disclosed below.

Embodiment 1

A production method for a polyimide resin powder, comprising the step of reacting (A) a tetracarboxylic acid component comprising a tetracarboxylic dianhydride with (B) a diamine component comprising an aliphatic diamine in the presence of (C) a solvent comprising an alkylene glycol-based solvent represented by the formula (1):

(1)

wherein $Ra_1$ represents a hydrogen atom or an alkyl group having from 1 to 4 carbon atoms, $Ra_2$ represents a linear alkylene group having from 2 to 6 carbon atoms, and n represents an integer of 1-3.

Embodiment 2

The production method according to embodiment [1], wherein the alkylene glycol-based solvent has a boiling point of 140° C. or higher.

Embodiment 3

The production method according to embodiment [1] or [2], wherein $Ra_1$ is an alkyl group having from 1 to 4 carbon atoms.

Embodiment 4

The production method according to any one of embodiments [1] to [3], wherein n is 2 or 3.

Embodiment 5

The production method according to any one of embodiments [1] to [4], wherein $Ra_2$ is an ethylene group.

Embodiment 6

The production method according to any one of embodiments [1] to [5], wherein the alkylene glyco-based solvent is 2-(2-methoxyethoxy)ethanol or 2-(2-ethoxyethoxy)ethanol.

Embodiment 7

The production method according to any one of embodiments [1] to [6], wherein the content of the alkylene glycol-based solvent in the solvent (C) is 75 mass % or more.

Embodiment 8

The production method according to any one of embodiments [1] to [7], wherein the step of reacting (A) the tetracarboxylic acid component with (B) the diamine component comprises: step (i) of adding (b) a solution comprising the diamine component (B) to (a) a solution comprising the tetracarboxylic acid component (A) to prepare (c) a solution comprising a polyamic acid; and step (ii) imidizing the polyamic acid by heating the solution (c) to obtain a polyimide resin, wherein in the step (i), the solution (b) is added to the solution (a) such that the amount of the diamine component (B) added per unit time with respect to 1 mol of the tetracarboxylic acid component (A) is 0.1 mol/min or lower.

Embodiment 9

The production method according to embodiment [8], wherein in the step (i), the solution (b) is added to the solution (a) such that the amount of the diamine component (B) added per unit time with respect to 1 mol of the tetracarboxylic acid component (A) is 0.005 mol/min or higher.

Embodiment 10

The production method according to any one of embodiments [1] to [9], wherein the diamine component (B) comprises (B1) a diamine represented by the formula (B1-1) and (B2) a diamine represented by the formula (B2-1) as the aliphatic diamine:

(B1-1)

(B2-1)

wherein $R_1$ represents a divalent group having from 6 to 22 carbon atoms containing at least one alicyclic hydrocarbon structure, and $R_2$ represents a divalent chain aliphatic group having from 5 to 20 carbon atoms.

Embodiment 11

The production method according to embodiment [10], wherein the diamine (B1) is represented by the formula (B1-2):

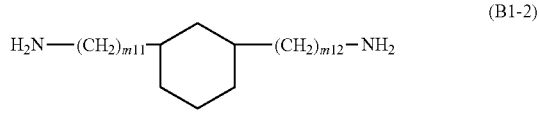

(B1-2)

wherein $m_{11}$ and $m_{12}$ each independently represent an integer of 0-2.

Embodiment 12

The production method according to embodiments [10] or [11], wherein the amount of the diamine (B1) with respect to the total amount of the diamine (B1) and the diamine (B2) is from 40 to 70 mol %.

Embodiment 13

The production method according to any one of embodiments [10] to [12], wherein the diamine component (B) further comprises (B3) a diamine represented by the formula (B3-1) in addition to the aliphatic diamine, wherein the amount of the diamine (B3) with respect to the total amount of the diamine (B1) and the diamine (B2) is 25 mol %. or less:

(B3-1)

wherein $R_3$ represents a divalent group having from 6 to 22 carbon atoms containing at least one aromatic ring.

Embodiment 14

The production method according to any one of embodiments [1] to [13], wherein the tetracarboxylic dianhydride is represented by the formula (A-1):

(A-1)

wherein X represents a tetravalent group having from 6 to 22 carbon atoms containing at least one aromatic ring.

Embodiment 15

The production method according to any one of embodiments [1] to [14], wherein the tetracarboxylic dianhydride is pyromellitic dianhydride.

Embodiment 16

The production method according to any one of embodiments [1] to [15], wherein the polyimide resin to be produced is a thermoplastic polyimide resin comprising a repeating unit represented by the following formula (I) and a repeating unit represented by the following formula (II), wherein the content ratio of the repeating unit of the formula (I) with respect to the total of the repeating unit of the formula (I) and the repeating unit of the formula (II) is from 40 to 70 mol %:

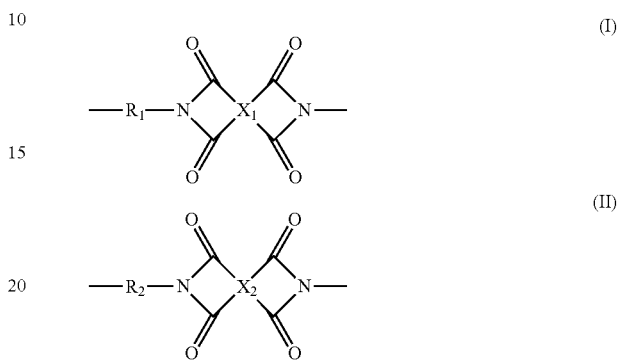

wherein $R_1$ represents a divalent group having from 6 to 22 carbon atoms containing at least one alicyclic hydrocarbon structure, $R_2$ represents a divalent chain aliphatic group having from 5 to 20 carbon atoms, and $X_1$ and $X_2$ each independently represent a tetravalent group having from 6 to 22 carbon atoms containing at least one aromatic ring.

Embodiment 17

The production method according to any one of embodiments [1] to [16], wherein the reaction of the tetracarboxylic acid component (A) with the diamine component (B) is carried out under normal pressure.

Embodiment 18

The production method according to any one of embodiments [8] to [17], wherein the area ratio of a peak whose peak top is present at a molecular weight of 1000 or smaller is 2 area % or less when the obtained product is measured by gel permeation chromatography.

Embodiment 19

A thermoplastic polyimide resin powder which is a powder of a thermoplastic polyimide resin comprising a repeating unit represented by the following formula (I) and a repeating unit represented by the following formula (II), wherein the content ratio of the repeating unit of the formula (I) with respect to the total of the repeating unit of the formula (I) and the repeating unit of the formula (II) is 40 to 70 mol %, and the ratio of particles passing through a sieve with a mesh opening of 500 vim is 90 mass % or more:

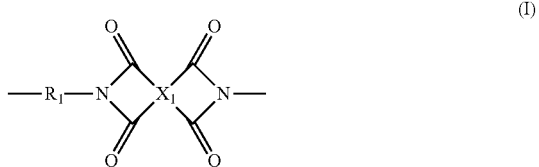

(I)

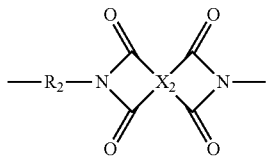
(II)

wherein $R_1$ represents a divalent group having from 6 to 22 carbon atoms containing at least one alicyclic hydrocarbon structure, $R_2$ represents a divalent chain aliphatic group having from 5 to 20 carbon atoms, and $X_1$ and $X_2$ each independently represent a tetravalent group having from 6 to 22 carbon atoms containing at least one aromatic ring.

Embodiment 20

The thermoplastic polyimide resin powder according to embodiment [19], wherein the ratio of particles passing through a sieve with a mesh opening of 250 μm is 90 mass % or more.

Embodiment 21

The thermoplastic polyimide resin powder according to embodiment [19] or [20], wherein $R_1$ is a divalent group represented by the following formula (R1-1) or (R1-2).

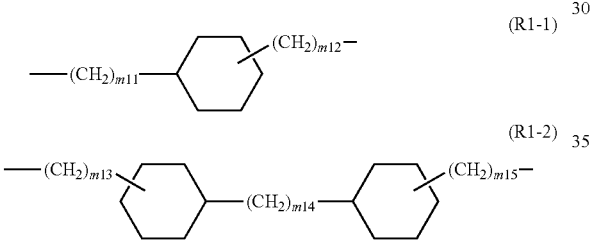

wherein $m_{11}$ and $m_{12}$ each independently represent an integer of 0-2, and $m_{13}$ to $m_{15}$ each independently represent an integer of 0-2.

Embodiment 22

The thermoplastic polyimide resin powder according to any one of embodiments [19] to [21], wherein $R_1$ is a divalent group represented by the following formula (R1-3):

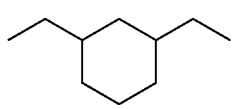 (R1-3)

Embodiment 23

The thermoplastic polyimide resin powder according to any one of embodiments [19] to [22], wherein $R_2$ is an alkylene group having from 5 to 20 carbon atoms.

Embodiment 24

The thermoplastic polyimide resin powder according to embodiment [23], wherein $R_2$ is a hexamethylene group.

Embodiment 25

The thermoplastic polyimide resin powder according to any one of embodiments [19] to [22], wherein $R_2$ is a divalent group represented by the following formula (R2-1) or (R2-2):

$$—(CH_2)_{m21}—O—(CH_2)_{m22}— \quad (R2\text{-}1)$$

$$—(CH_2)_{m23}—O—(CH_2)_{m24}—O—(CH_2)_{m25}— \quad (R2\text{-}2)$$

wherein $m_{21}$ and $m_{22}$ each independently represent an integer of 1-11, and $m_{23}$ to $m_{25}$ each independently represent an integer of 1-10.

Embodiment 26

The thermoplastic polyimide resin powder according to any one of embodiments [19] to [25], wherein $X_1$ and $X_2$ are each independently a tetravalent group represented by any of the following formulas (X-1) to (X-4):

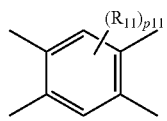 (X-1)

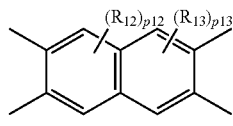 (X-2)

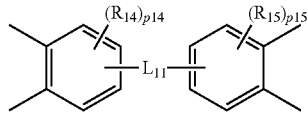 (X-3)

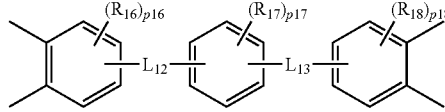 (X-4)

wherein $R_{11}$ to $R_{18}$ each independently represent an alkyl group having from 1 to 4 carbon atoms, $p_{11}$ to $p_{13}$ each independently represent an integer of 0-2, $P_{14}$, $p_{15}$, $p_{16}$, and $p_{18}$ each independently represent an integer of 0-3, $p_{17}$ represents an integer of 0-4, and $L_{11}$ to $L_{13}$ each independently represent a single bond, an ether group, a carbonyl group, or an alkylene group having from 1 to 4 carbon atoms.

Embodiment 27

The thermoplastic polyimide resin powder according to any one of embodiments [19] to [26], wherein the thermoplastic polyimide resin further comprises a repeating unit represented by the following formula (III), wherein the content ratio of the repeating unit of the formula (III) with respect to the total of the repeating unit of the formula (I) and the repeating unit of the formula (II) is 25 mol % or less:

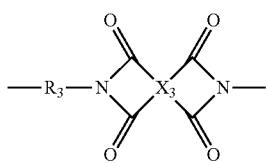

(III)

wherein $R_3$ represents a divalent group having from 6 to 22 carbon atoms containing at least one aromatic ring, and $X_3$ represents a tetravalent group having from 6 to 22 carbon atoms containing at least one aromatic ring.

Embodiment 28

The thermoplastic polyimide resin powder according to embodiment [27], wherein $R_3$ is a divalent group represented by the following formula (R3-1) or (R3-2):

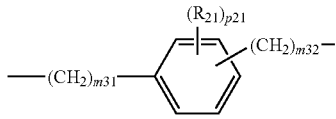

(R3-1)

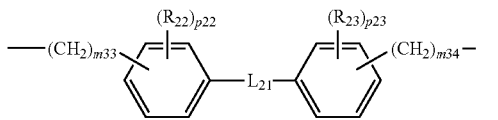

(R3-2)

wherein $m_{31}$ and $m_{32}$ each independently represent an integer of 0-2, $m_{33}$ and $m_{34}$ each independently represent an integer of 0-2, $R_{21}$, $R_{22}$, and $R_{23}$ each independently represent an alkyl group having from 1 to 4 carbon atoms, an alkenyl group having from 2 to 4 carbon atoms, or an alkynyl group having from 2 to 4 carbon atoms, $p_{21}$, $p_{22}$, and $p_{23}$ each independently represent an integer of 0-4, and $L_{21}$ represents a single bond, an ether group, a carbonyl group, or an alkylene group having from 1 to 4 carbon atoms.

Embodiment 29

The thermoplastic polyimide resin powder according to embodiment [27] or [28], wherein $X_3$ is a tetravalent group represented by any of the following formulas (X-1) to (X-4).

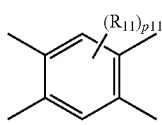

(X-1)

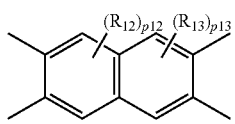

(X-2)

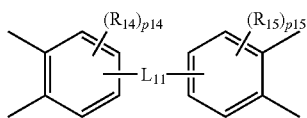

(X-3)

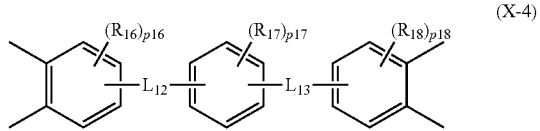

(X-4)

wherein $R_{11}$ to $R_{18}$ each independently represent an alkyl group having from 1 to 4 carbon atoms, $p_{11}$ to $p_{13}$ each independently represent an integer of 0-2, $p_{14}$, $p_{15}$, $p_{16}$, and $p_{18}$ each independently represent an integer of 0-3, $p_{17}$ represents an integer of 0-4, and $L_{11}$ to $L_{13}$ each independently represent a single bond, an ether group, a carbonyl group, or an alkylene group having from 1 to 4 carbon atoms.

Embodiment 30

The thermoplastic polyimide resin powder according to any one of embodiments [19] to [29], wherein the thermoplastic polyimide resin has a melting point of 360° C. or lower and a glass transition temperature of 170° C. or higher.

Embodiment 31

The thermoplastic polyimide resin powder according to any one of embodiments [19] to [29], wherein the amount of heat at the exothermic peak of crystallization of the thermoplastic polyimide resin observed in a differential scanning calorimeter is 5 mJ/mg or higher when the temperature is decreased at a cooling rate of 10° C./min or more after fusion.

The invention claimed is:

1. A production method for a polyimide resin powder, comprising reacting (A) a tetracarboxylic acid component comprising a tetracarboxylic dianhydride with (B) a diamine component comprising an aliphatic diamine in the presence of (C) a solvent comprising an alkylene glycol-based solvent represented by the formula (1):

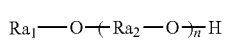

(1)

wherein $Ra_1$ represents a hydrogen atom or an alkyl group having from 1 to 4 carbon atoms, $Ra_2$ represents a linear alkylene group having from 2 to 6 carbon atoms, and n represents an integer of 1-3, wherein said method further comprises separately preparing (a) a solution comprising said tetracarboxylic acid component (A) in said solvent (C) and (b) a solution comprising said diamine component (B) in said solvent (C)

then adding said solution (b) to said solution (a) or adding said solution (a) to said solution (b) to prepare (c) a solution comprising a polyamic acid, and subsequently imidizing said polyamide acid by heating said solution (c) to synthesize said polyimide resin, thereby depositing said polyimide resin powder in said solution (c).

2. The production method according to claim 1, wherein the alkylene glycol-based solvent has a boiling point of 140° C. or higher.

3. The production method according to claim 1, wherein $Ra_1$ is an alkyl group having from 1 to 4 carbon atoms.

4. The production method according to claim 1, wherein n is 2 or 3.

5. The production method according to claim 1, wherein the alkylene glycol-based solvent is 2-(2-methoxyethoxy)ethanol or 2-(2-ethoxyethoxy)ethanol.

6. The production method according to claim 1, wherein the content of the alkylene glycol-based solvent in the solvent (C) is 75 mass % or more.

7. The production method according to claim 1, wherein the step of reacting (A) the tetracarboxylic acid component with (B) the diamine component comprises: step (i) of adding (b) a solution comprising the diamine component (B) to (a) a solution comprising the tetracarboxylic acid component (A) to prepare (c) a solution comprising a polyamic acid; and step (ii) imidizing the polyamic acid by heating the solution (c) to obtain a polyimide resin, wherein in the step (i), the solution (b) is added to the solution (a) such that the amount of the diamine component (B) added per unit time with respect to 1 mol of the tetracarboxylic acid component (A) is 0.1 mol/min or lower.

8. The production method according to claim 7, wherein in the step (i), the solution (b) is added to the solution (a) such that the amount of the diamine component (B) added per unit time with respect to 1 mol of the tetracarboxylic acid component (A) is 0.005 mol/min or higher.

9. The production method according to claim 1, wherein the diamine component (B) comprises (B1) a diamine represented by the formula (B1-1) and (B2) a diamine represented by the formula (B2-1) as the aliphatic diamine:

wherein $R_1$ represents a divalent group having from 6 to 22 carbon atoms containing at least one alicyclic hydrocarbon structure, and $R_2$ represents a divalent chain aliphatic group having from 5 to 20 carbon atoms.

10. The production method according to claim 9, wherein the diamine (B1) is represented by the formula (B1-2):

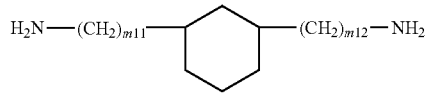

wherein $m_{11}$ and $m_{12}$ each independently represent an integer of 0-2.

11. The production method according to claim 9, wherein the amount of the diamine (B1) with respect to the total amount of the diamine (B1) and the diamine (B2) is from 40 to 70 mol %.

12. The production method according to claim 9, wherein the diamine component (B) further comprises (B3) a diamine represented by the formula (B3-1) in addition to the aliphatic diamine, wherein the amount of the diamine (B3) with respect to the total amount of the diamine (B1) and the diamine (B2) is 25 mol %. or less:

wherein $R_3$ represents a divalent group having from 6 to 22 carbon atoms containing at least one aromatic ring.

13. The production method according to claim 1, wherein the tetracarboxylic dianhydride is represented by the formula (A-1):

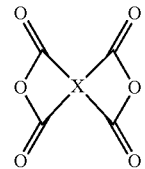

wherein X represents a tetravalent group having from 6 to 22 carbon atoms containing at least one aromatic ring.

14. The production method according to claim 1, wherein the polyimide resin to be produced is a thermoplastic polyimide resin comprising a repeating unit represented by the following formula (I) and a repeating unit represented by the following formula (II), wherein the content ratio of the repeating unit of the formula (I) with respect to the total of the repeating unit of the formula (I) and the repeating unit of the formula (II) is from 40 to 70 mol %:

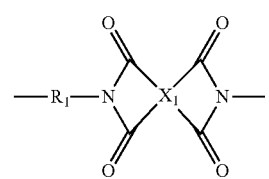

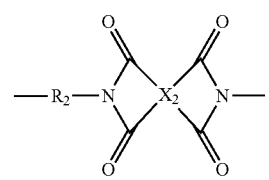

wherein $R_1$ represents a divalent group having from 6 to 22 carbon atoms containing at least one alicyclic hydrocarbon structure, $R_2$ represents a divalent chain aliphatic group having from 5 to 20 carbon atoms, and $X_1$ and $X_2$ each independently represent a tetravalent group having from 6 to 22 carbon atoms containing at least one aromatic ring.

15. The production method according to claim 7, wherein the area ratio of a peak whose peak top is present at a molecular weight of 1000 or smaller is 2 area % or less when the obtained product is measured by gel permeation chromatography.

16. A thermoplastic polyimide resin powder which is a powder of a thermoplastic polyimide resin comprising a repeating unit represented by the following formula (I) and a repeating unit represented by the following formula (II), wherein the content ratio of the repeating unit of the formula (I) with respect to the total of the repeating unit of the formula (I) and the repeating unit of the formula (II) is 40 to 70 mol %, and the ratio of particles passing through a sieve with a mesh opening of 500 μm is 90 mass % or more:

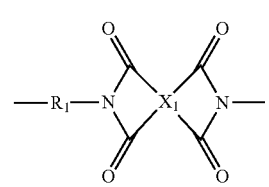

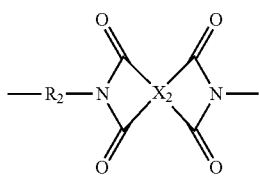

(II)

wherein $R_1$ represents a divalent group having from 6 to 22 carbon atoms containing at least one alicyclic hydrocarbon structure, $R_2$ represents a divalent chain aliphatic group having from 5 to 20 carbon atoms, and $X_1$ and $X_2$ each independently represent a tetravalent group having from 6 to 22 carbon atoms containing at least one aromatic ring.

17. The thermoplastic polyimide resin powder according to claim 16, wherein the ratio of particles passing through a sieve with a mesh opening of 250 μm is 90 mass % or more.

18. The thermoplastic polyimide resin powder according to claim 16, wherein $R_1$ is a divalent group represented by the following formula (R1-1) or (R1-2):

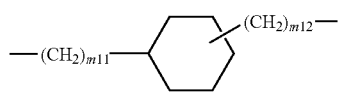

(R1-1)

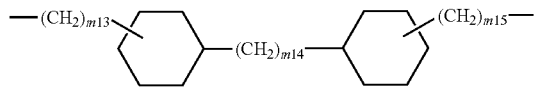

(R1-2)

wherein $m_{11}$ and $m_{12}$ each independently represent an integer of 0-2, and $m_{13}$ to $m_{15}$ each independently represent an integer of 0-2.

19. The thermoplastic polyimide resin powder according to claim 16, wherein $R_2$ is an alkylene group having from 5 to 20 carbon atoms.

20. The thermoplastic polyimide resin powder according to claim 16, wherein $X_1$ and $X_2$ are each independently a tetravalent group represented by any of the following formulas (X-1) to (X-4):

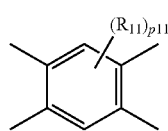

(X-1)

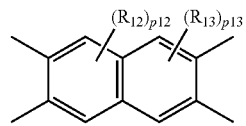

(X-2)

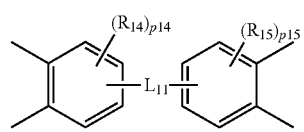

(X-3)

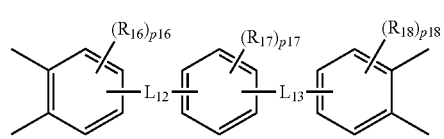

(X-4)

wherein $R_{11}$ to $R_{16}$ each independently represent an alkyl group having from 1 to 4 carbon atoms, $p_{11}$ to $p_{13}$ each independently represent an integer of 0-2, $P_{14}$, $P_{15}$, $p_{16}$, and $p_{18}$ each independently represent an integer of 0-3, $p_{17}$ represents an integer of 0-4, and $L_{11}$ to $L_{13}$ each independently represent a single bond, an ether group, a carbonyl group, or an alkylene group having from 1 to 4 carbon atoms.

21. The thermoplastic polyimide resin powder according to claim 16, wherein the thermoplastic polyimide resin further comprises a repeating unit represented by the following formula (III), wherein the content ratio of the repeating unit of the formula (III) with respect to the total of the repeating unit of the formula (I) and the repeating unit of the formula (II) is 25 mol % or less:

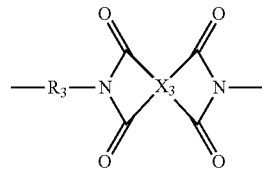

(III)

wherein $R_3$ represents a divalent group having from 6 to 22 carbon atoms containing at least one aromatic ring, and $X_3$ represents a tetravalent group having from 6 to 22 carbon atoms containing at least one aromatic ring.

22. The thermoplastic polyimide resin powder according to claim 16, wherein the thermoplastic polyimide resin has a melting point of 360° C. or lower and a glass transition temperature of 170° C. or higher.

\* \* \* \* \*